TRAVERSING MECHANISM FOR PICK-UP TRANSDUCER ARM FOR DISC RECORDS

Filed Aug. 11, 1967

14 Sheets-Sheet 8

TRAVERSING MECHANISM FOR PICK-UP TRANSDUCER ARM FOR DISC RECORDS

Filed Aug. 11, 1967

United States Patent Office 3,476,394

Patented Nov. 4, 1969

3,476,394

TRAVERSING MECHANISM FOR PICK-UP TRANSDUCER ARM FOR DISC RECORDS

Richard W. Birch, Strelley Barn, Woodham Mortimer, Maldon, England

Filed Aug. 11, 1967, Ser. No. 660,033
Claims priority, application Great Britain, Aug. 17, 1966, 36,840/66
Int. Cl. G11b *3/10*
U.S. Cl. 274—23 27 Claims

ABSTRACT OF THE DISCLOSURE

Traversing mechanism for pick-up transducer arm for disc records comprising a transducer arm on which the transducer is carried, the transducer having a stylus for engaging a spiral trace on a rotatable disc, a rotatable slave arm on which the transducer arm is pivotally supported, sensing means for sensing departures of the line joining the transducer stylus and the rotational axis of the transducer arm from the position in which said line is tangential to the spiral trace at the point of contact with the stylus, and drive means for driving the slave arm in its path of rotational movement as the stylus means traverses in a curved path the spiral trace on a disc.

Figure 1:
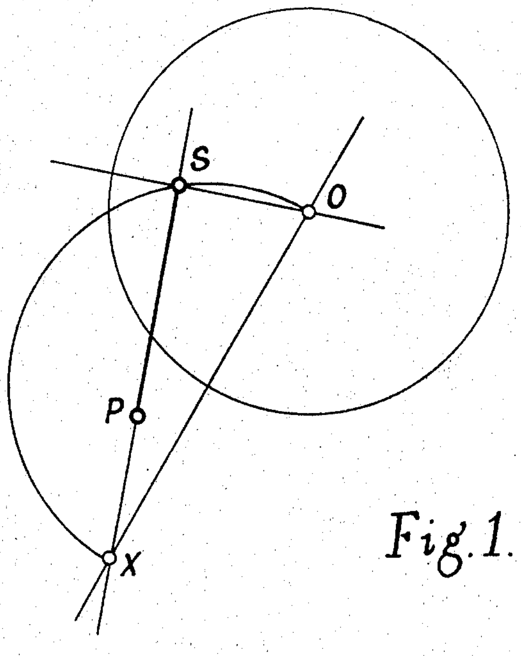

This invention relates to mountings for transducers having stylus means for engaging a spiral trace containing a signal formed on a rotatable disc. In a familiar known form of mounting of the kind set forth, the transducer is carried on one end of an arm which is curved in plan view and is horizontally disposed during operation. Towards the end thereof remote from the transducer the arm is pivotally mounted so as to be rotatable about a vertical axis. With such an arrangement the stylus traverses the disc in an arcuate path and during traverse of the stylus the location of the plane of vibration of the stylus varies relative to the vertical plane containing the stylus and the centre of the disc.

If by virtue of the geometry of the arrangement the tracking error, that is to say, the angle between the line in the plane of vibration of the stylus at the surface of the disc and the line containing the stylus and the centre of the disc, is kept small throughout the traverse of the stylus, the consequence is that there is exerted on the stylus as it moves across the disc a substantially constant side pressure, that is to say, a pressure acting on the stylus in the plane of the spiral trace and in the direction from the centre of the spiral to the stylus. It will be apparent that side pressure is the equilibrant of the drag force at the stylus which is tangential to the disc trace at the stylus and the tensile force in the transducer arm arising from the drag force.

For optimum reproduction it is desirable that both side pressure and tracking error be minimised, and it is apparent that the known form of mounting does not achieve these desiderata. It is therefore an object of the present invention to provide a transducer mounting of the kind referred to, in the operation of which the reduction both of side pressure and of tracking error are compatible aims.

The present invention consists in a mounting for a transducer having stylus means for engaging a spiral trace containing a signal formed on a rotatable disc, comprising a transducer arm on which the transducer is carried, a slave arm mounted for rotational movement parallel with the plane of the disc and on which the transducer arm is supported for movement in relation to the slave arm about an axis normal to the plane of the disc, sensing means located between the stylus means and the axis, normal to the plane of the disc, of rotation of the transducer arm and adapted to sense departures of the line in the plane of the disc joining the point of contact of the stylus means and the disc to the axis normal to the plane of the disc of rotation of the transducer arm from the position in which said line is tangential to the spiral trace at the stylus means and drive means for driving the slave arm in its path of rotational movement as the stylus means traverses in a curved path a spiral trace on the disc, the dimensions of the slave arm and its path of rotational movement being such that during the traverse of the stylus means the said line in the plane of the disc lies on or close to the tangent to the spiral trace on the disc at the stylus means whilst the transducer is located so that the said line is disposed normal or substantially normal to the line of intersection of the plane of vibration of the stylus with the disc.

Preferably a control arm is mounted for rotation about an axis normal to the disc, and, at a location spaced from said axis is connected to the transducer arm, the length of the control arm between said axis and said location being freely variable.

Suitably, actuator means are provided for operating the drive means upon deviation of the transducer arm in one sense from a mean position to impart movement to the slave arm which reduces or cancels the said deviation or causes a deviation in the reverse sense of the transducer arm which is no greater in magnitude than the deviation in the one sense, the said mean position being that in which the point of engagement of the stylus with the spiral trace, the axis normal to the disc of rotation of the transducer arm and the rotational axis normal to the disc of the control arm are substantially coplanar.

In one form of the invention the actuator means comprise respective co-operating elements mounted on the transducer and control arms contact and separation of the co-operating elements taking place upon rotational movement of the transducer arm about the axis thereof normal to the disc to provide a switching action for operating the drive means.

In another form of the invention the actuator means comprise a magnet and a magnetically operated switch disposed one on the control arm and the other on the transducer arm so that deviation of the transducer arm to a predetermined extent on either side of the mean position effects switching action.

In a further form of the invention the actuator means include a photoelectric cell and a light source arranged in relation to the transducer and control arms so that deviation of the transducer arm from the mean position causes variation of the amount of light incident upon the cell.

In another form of the invention co-operating means are provided so that in operation of the drive means the path of the axis normal to the plane of the disc of movement of the transducer arm enables movement of the stylus in a part-circular arcuate path.

In a still further form of the invention the control arm and transducer arm are provided with respective co-operable indicating means whereby the relative positions of the said arms are observable so that the drive means can be continuously driven at a speed to effect such movement of the slave arm as the stylus traverses a spiral trace of a disc as will maintain the transducer arm and the control arm in desired relative positions.

Figure 6:
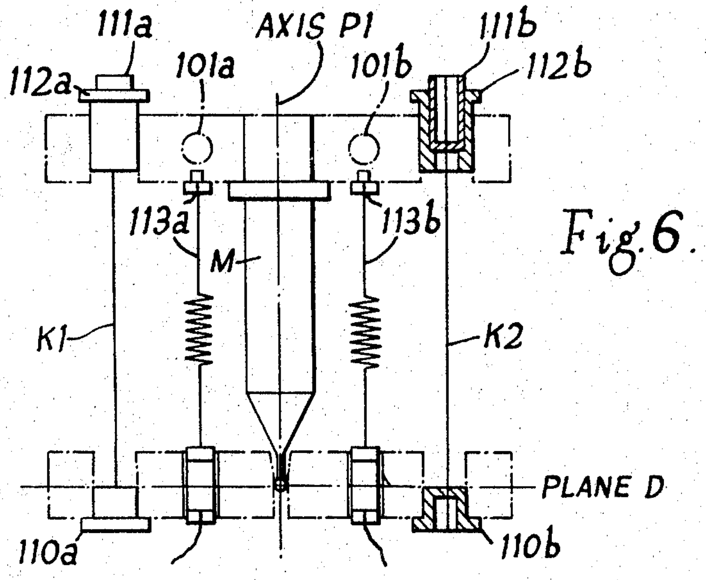
Figure 2:
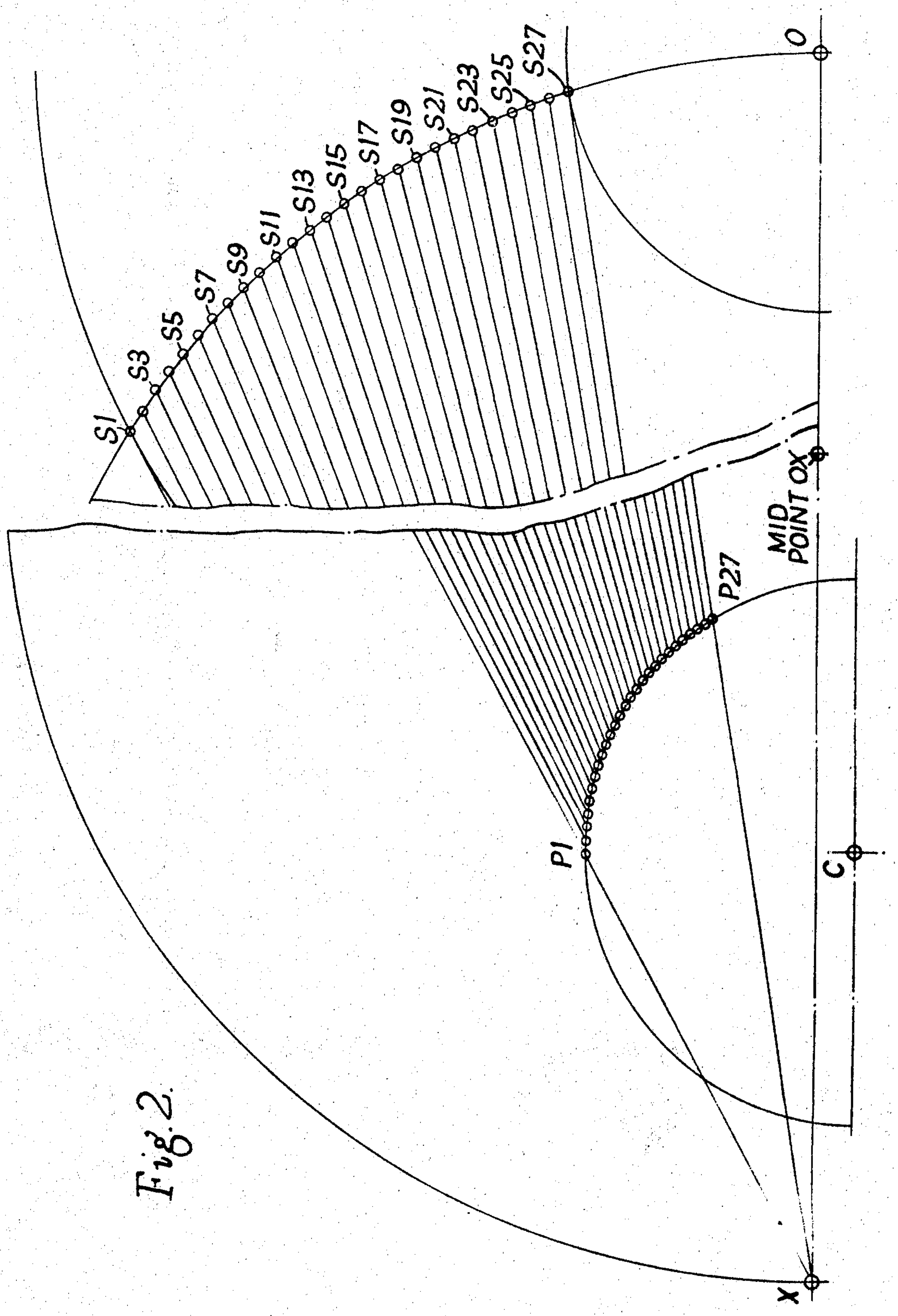
Figure 3:
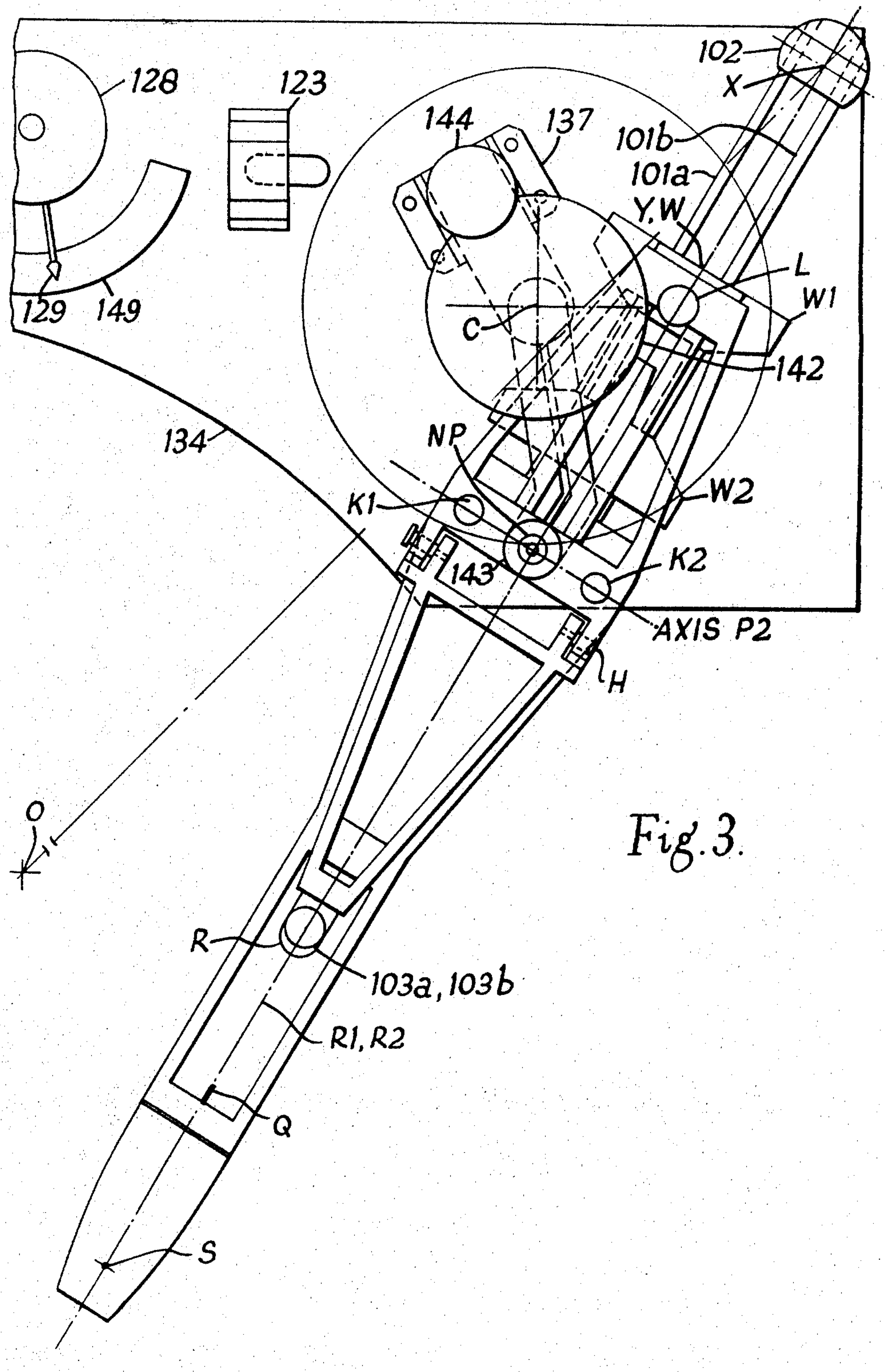
Figures 4A, 4B, 4C:
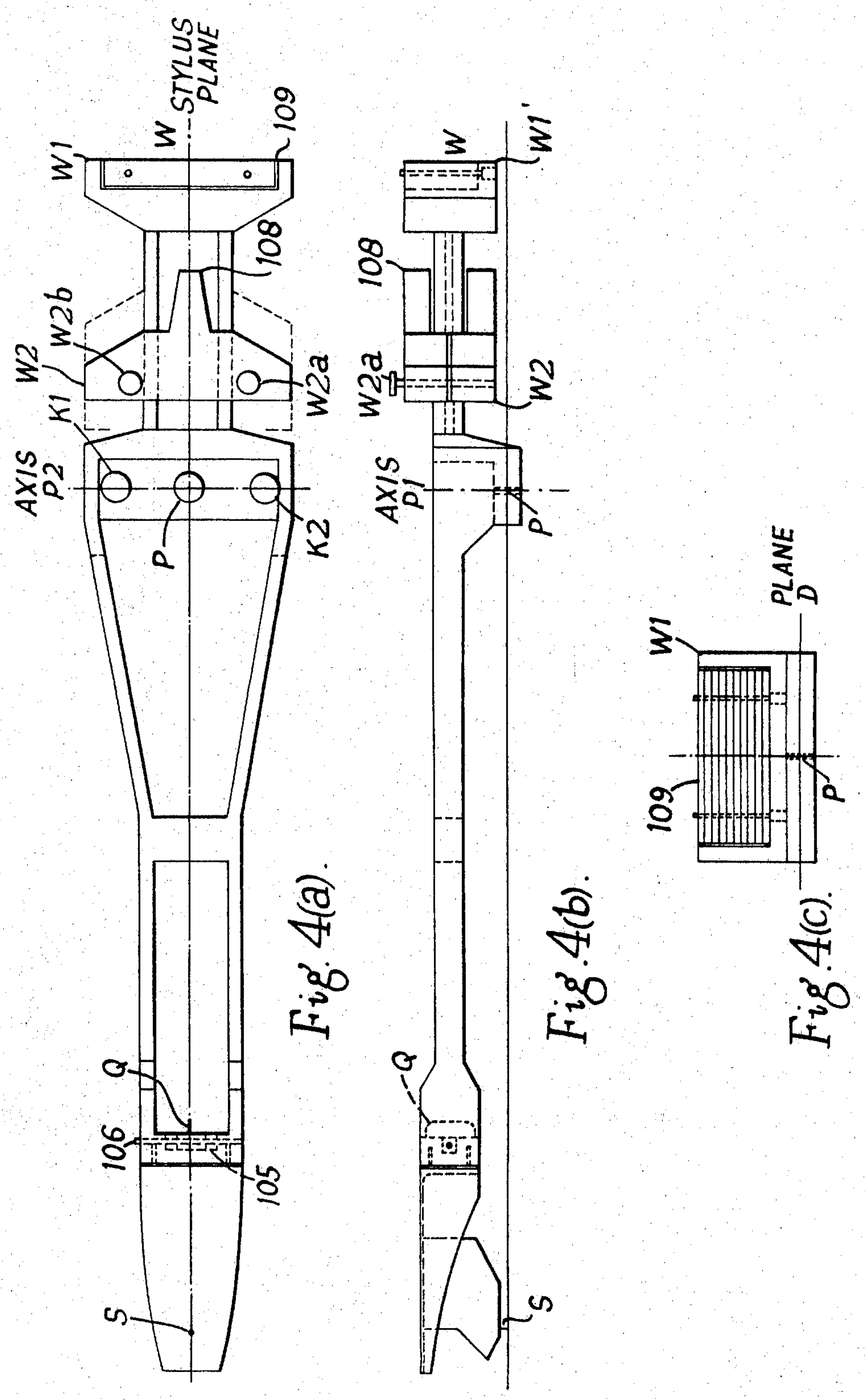
Figures 5A, 5B, 5C:
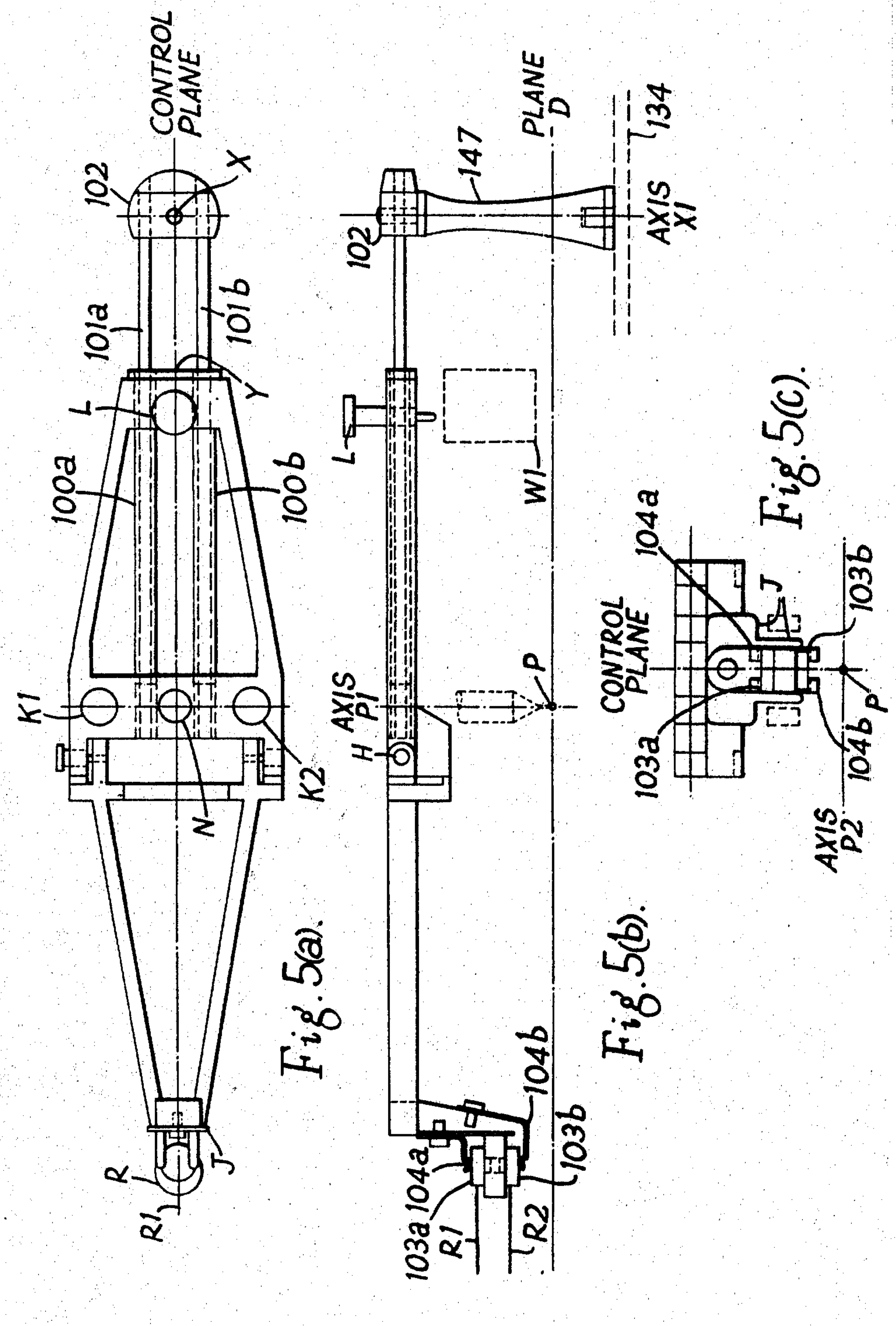

The invention will now be described by way of example with reference to the accompanying drawings in which:

FIGURES 1 and 2 are sketches which illustrate the theory on which the invention is based, FIGURE 3 is a plan view of the general arrangement of one embodiment of the invention, FIGURES 4*a*, *b* and *c* are respective plan, side and end views of the transducer arm, hereinafter also referred to as the stylus arm, of the arrangement illustrated in FIGURE 3, FIGURES 5*a*, *b* and *c* are respective plan, side and end views of the control arm of the arrangement illustrated in FIGURE 3, FIGURE 6 is a transverse view showing details of the mounting of the stylus arm of the previous FIGURES 3 to 5.

Figure 7A:
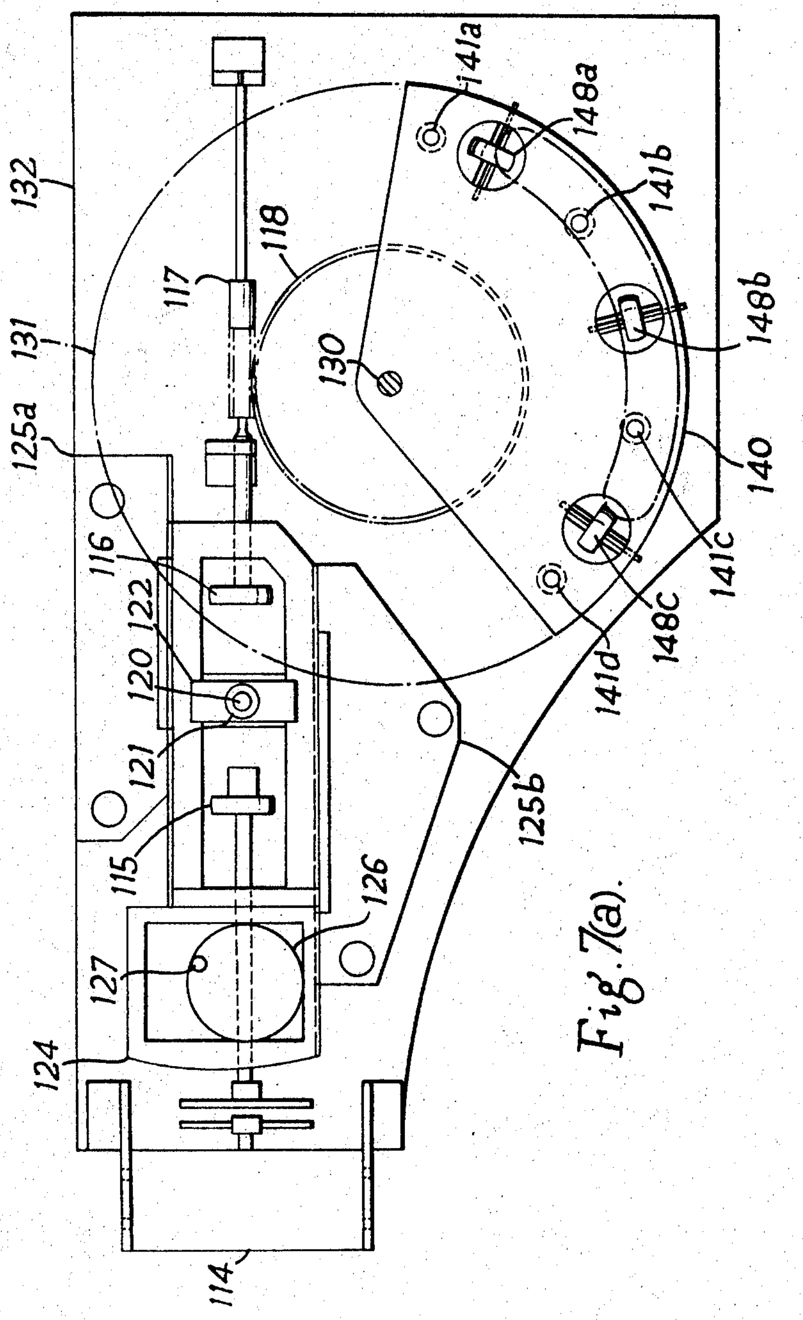
Figure 7B:
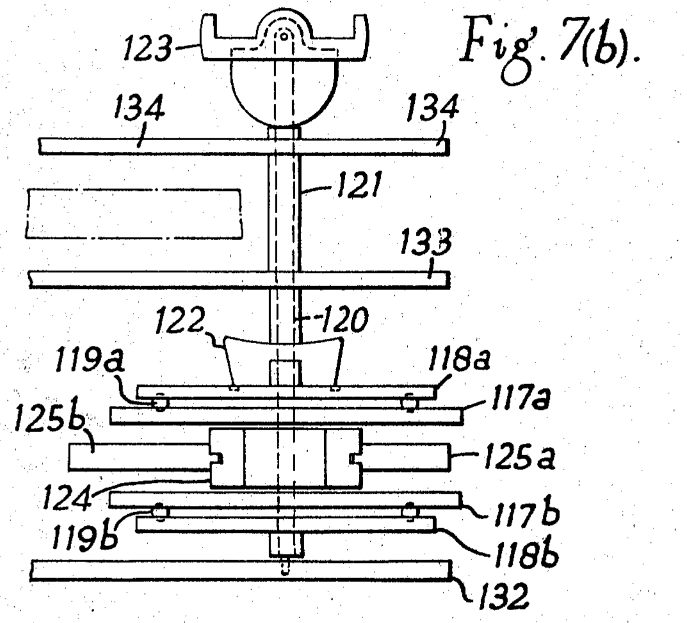
Figure 7D:
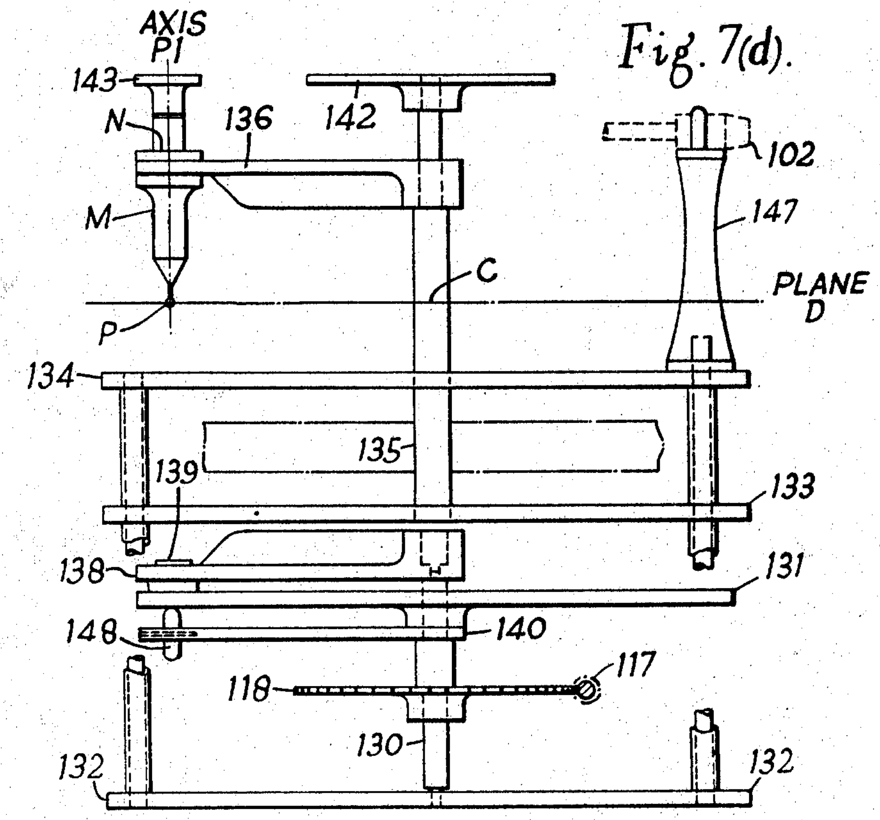
Figure 7C:
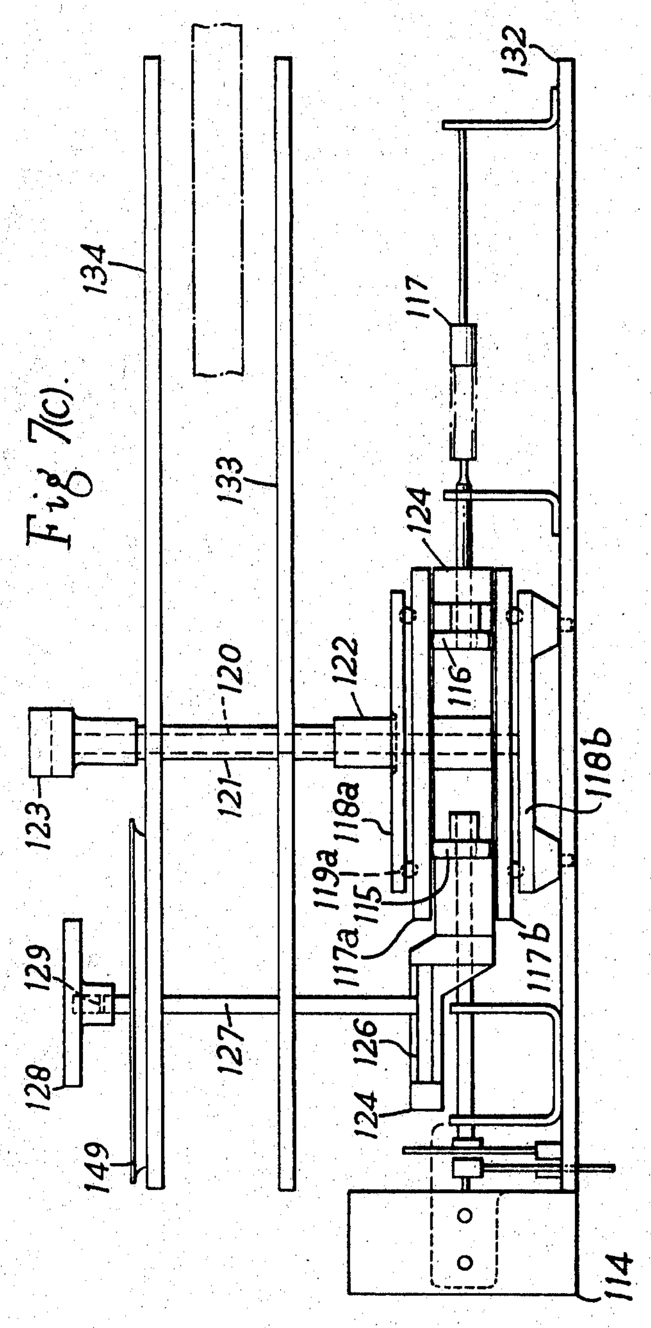
Figure 7E:
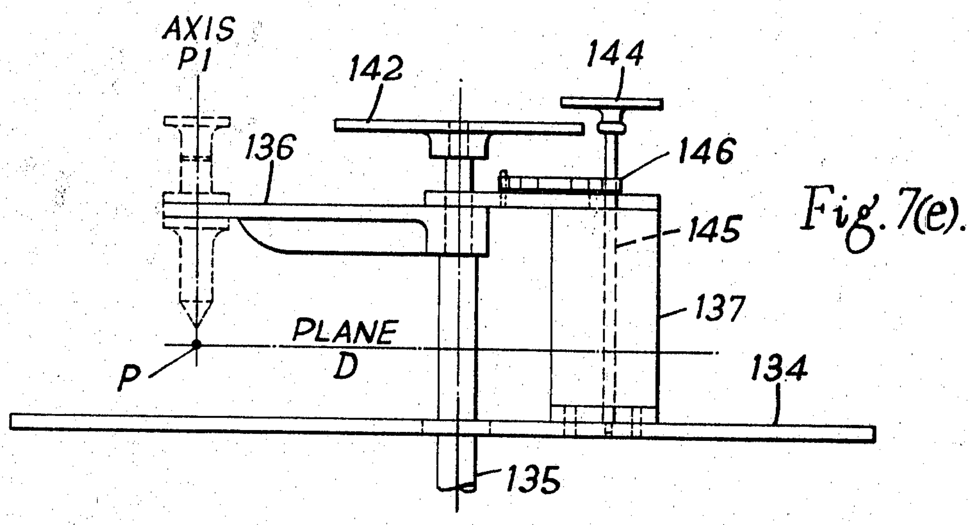
Figure 7F:
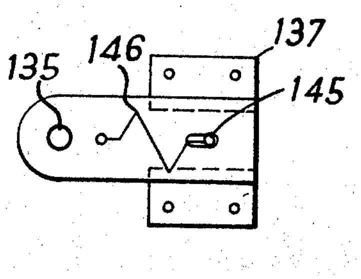
Figures 8A, 8B, 8C, 8D, 8E:
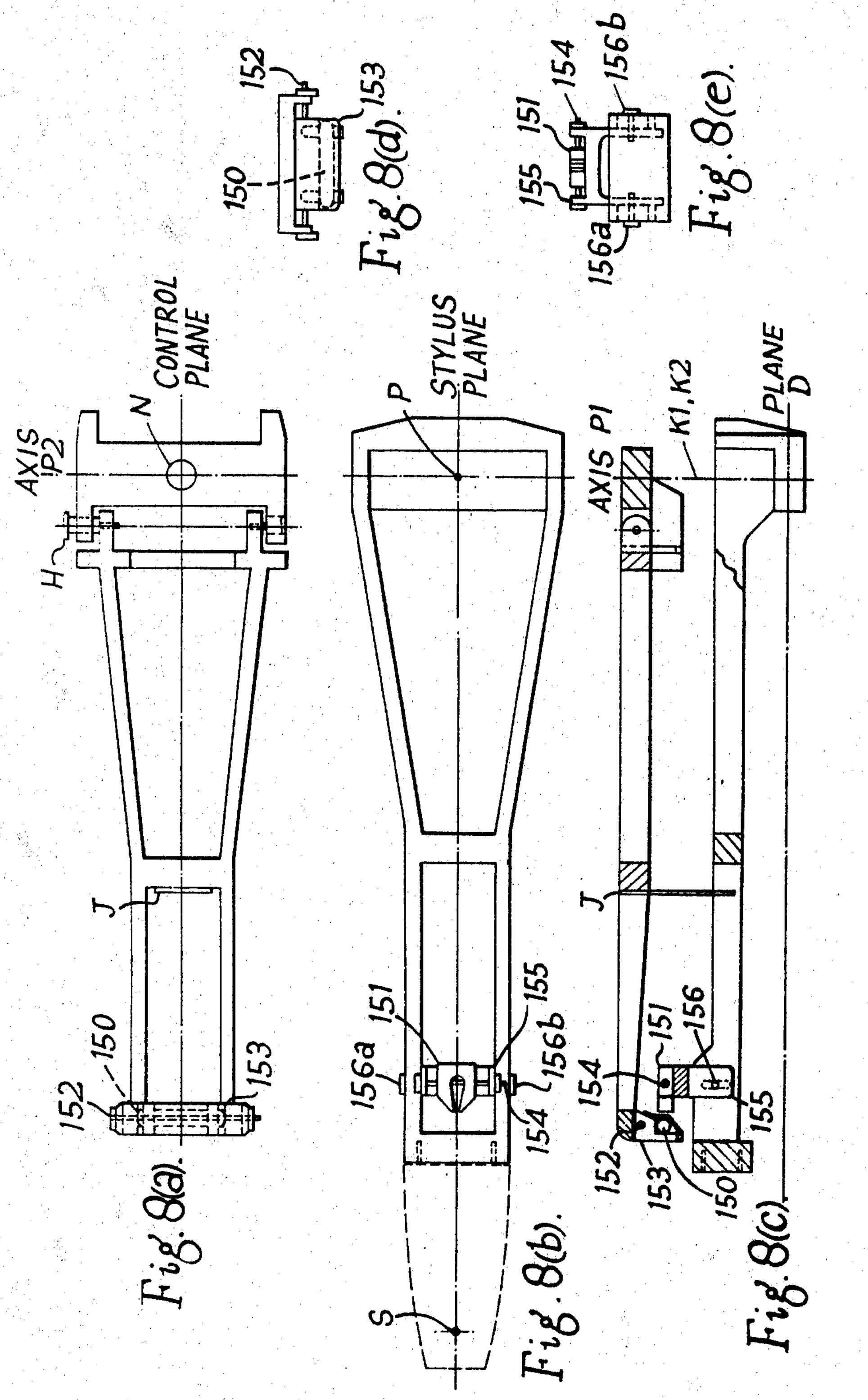
Figures 9A, 9B, 9C:
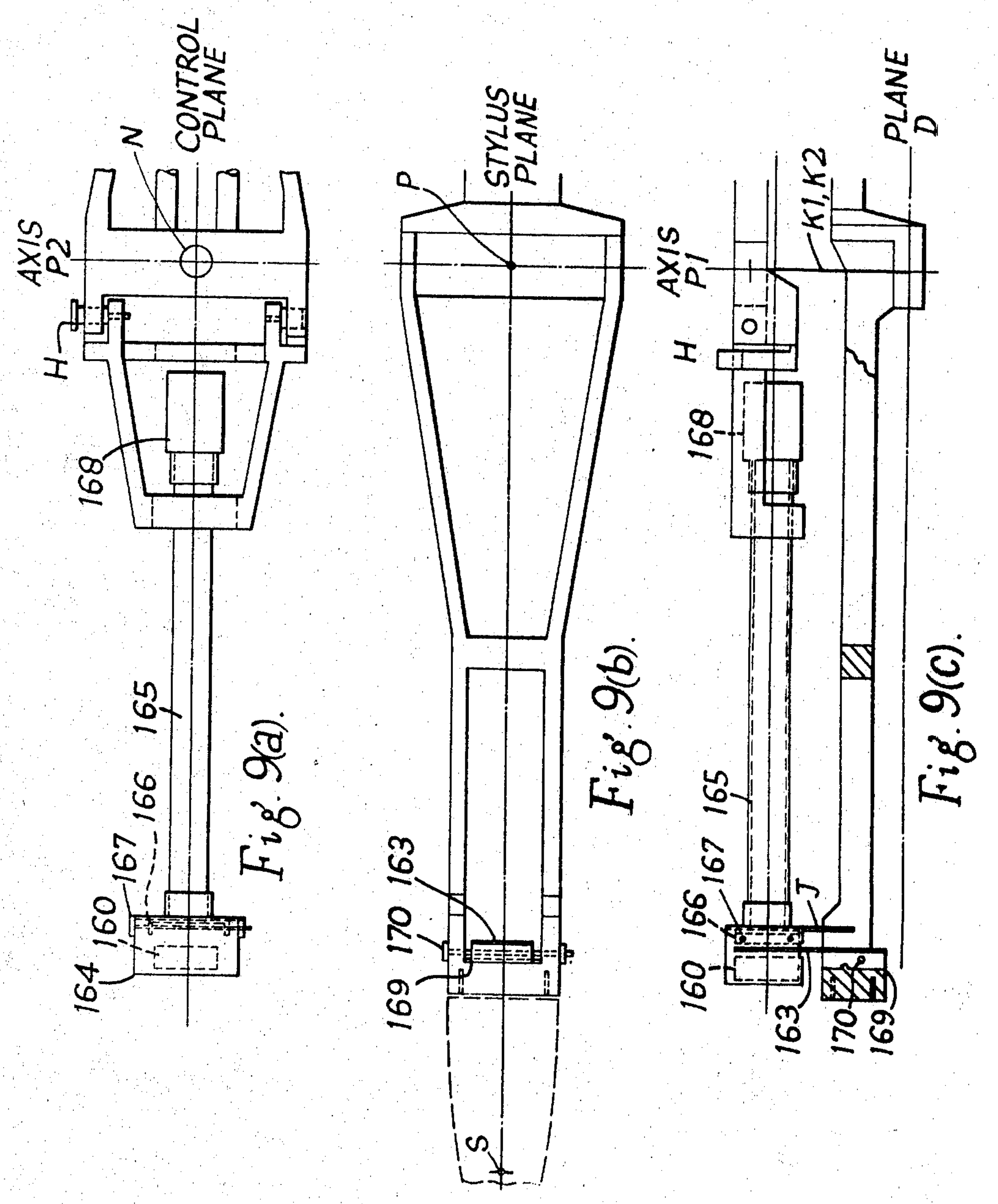
Figure 9D:
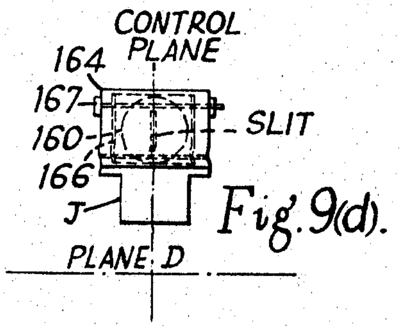
Figure 9E:
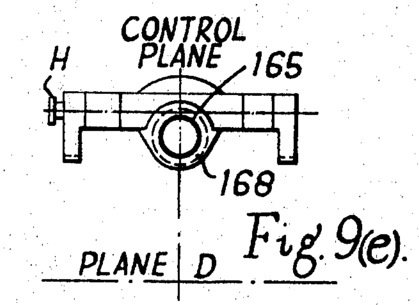
Figure 9F:
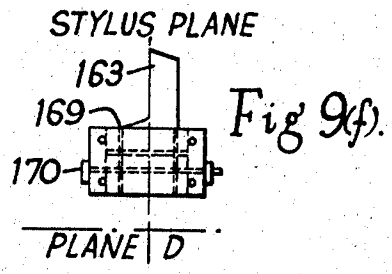
Figure 11B:
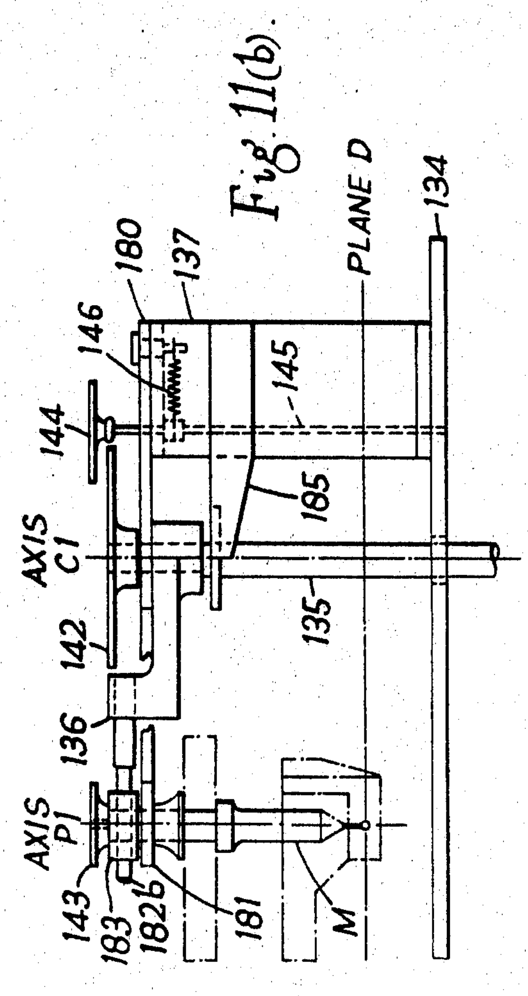
Figure 10:
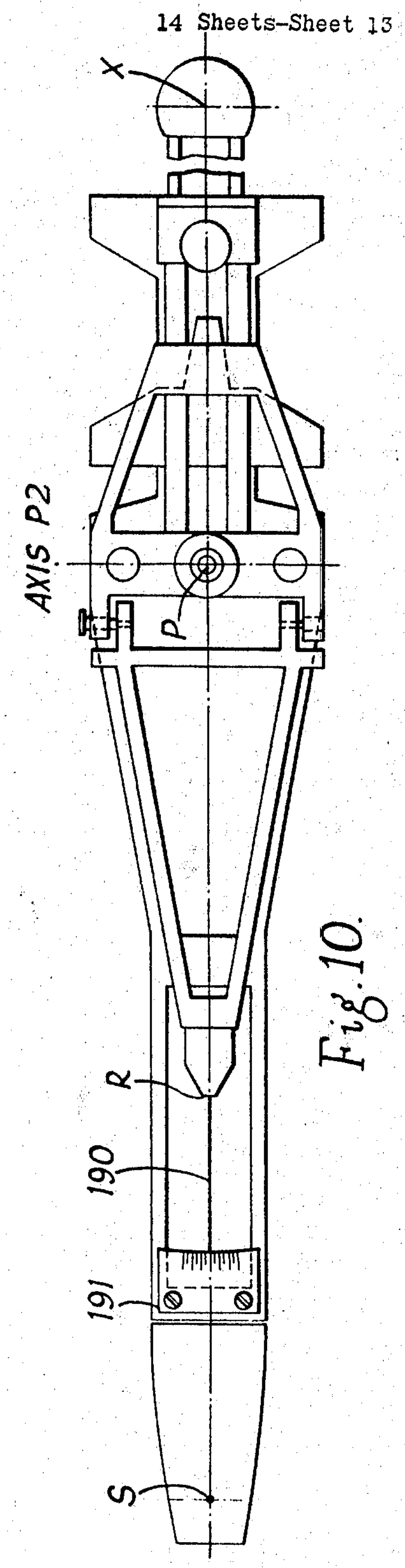
Figure 11A:
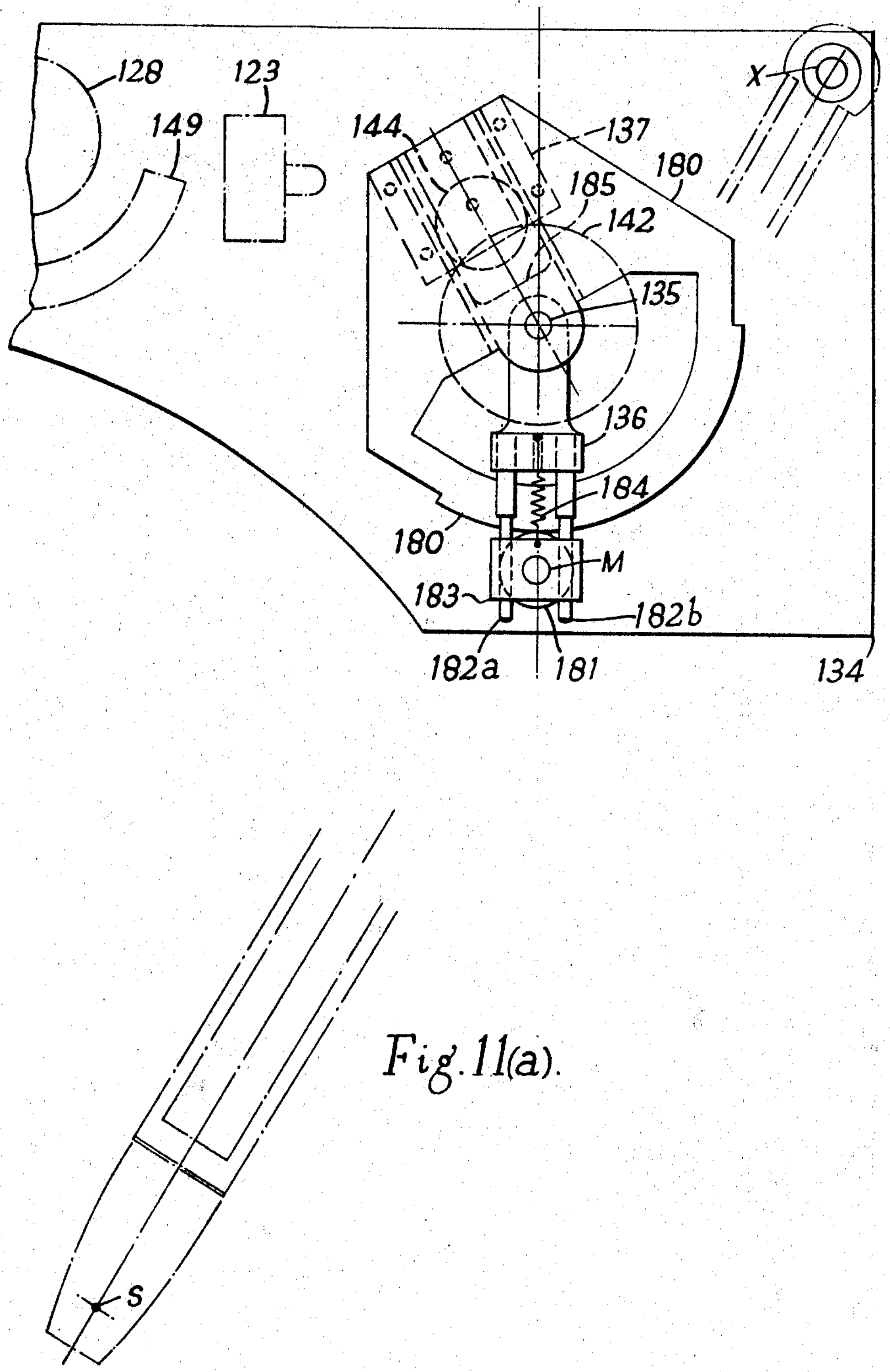

FIGURES 7*a*, *b*, *c*, *d*, *e* and *f* are respectively a plan view and side views at different locations of the slave arm and the drive therefor in the embodiment illustrated in FIGURES 3 to 6, FIGURES 8*a* and *d* are respective plan and end view of the control arm of a further embodiment of the invention, FIGURES 8*b* and *c* are plan and end views respectively of a stylus arm which co-operates with the control arm of FIGURES 8*a* and *d*, FIGURE 8*e* is a sectional side view showing the co-operation of the control and stylus arms of FIGURES 8*a* to *d*, FIGURES 9*a*, *d* and *e* are respectively a plan and two transverse views of a control arm of a further embodiment of the invention, FIGURES 9*b* and *f* are respective plan and end views of the stylus arm associated with the control arm of FIGURES 9*a*, *d* and *e*, FIGURE 9*c* is a sectional side view illustrating the co-operation between the control arm and stylus arm illustrated respectively in FIGURES 9*a*, *d* and *e* and FIGURES 9*b* and 9*f*, FIGURE 10 is a plan view of a further embodiment of the invention, and FIGURES 11*a* and 11*b* are respective plan and side views of a still further embodiment of the invention.

In the various embodiments to be described, it is a common feature that the path of the stylus across the disc is curved: and use is made of the fact that if a semicircle is described upon any segment of a straight line as diameter, the ends of that segment subtend 90° at any point on the semicircle.

With reference to FIGURE 1, O is the centre of the disc, X is a point fixed relative to O, and S is the stylus. SP is the transducer arm, of a fixed length, and P represents a point where the arm is pivoted. It is evident that if S lies on the semicircle drawn on OX as diameter and if P lies on the straight line SX, then the angle PSO is a right angle. Under these conditions and (neglecting any effect of any switching mechanism to be described later) side pressure is zero. If the stylus is mounted on the stylus arm so that the plane of vibration of the stylus intersects the plane of the disc in a line which is at right angles to the line SP, it follows that tracking error is zero.

For any given lengths OX and SP, the path of P is readily determined, and if these lengths are given values which are convenient for the sizes of commonly-used discs, it is found (see FIGURE 2) that the path of P can be imitated with great accuracy by a portion of a properly-chosen circle. Hence if C is the centre of such a circle, an arm pivoted at C and carrying the support-point P of arm PS can, by suitable rotation about C, maintain point P always on the straight line SX and permit the stylus to traverse the disc upon a path which is a very close approximation to a portion of the semicircle drawn on OX as diameter. From this it follows that under these conditions the angle PSO will always be very nearly a right angle.

FIGURE 2 shows twenty seven positions of the stylus S consequent upon movement of the point P about the centre C. With typical valves the length SP is 7 inches and the length OX is 12 inches and the maximum departure of point S from the ideal circular arc is 0.02 inch measured from the mid-point of OX i.e., radially.

For convenience, the arm PS is said to be in "the 90° position" when the angle PSO is 90°.

The types of embodiment to be described are divided for convenience into two classes called Class 1 and Class 11, according to the accuracy of control of the angle PSO.

In Class 11 the accuracy is less and the mechanism can be simpler.

In embodiments of Class 1, later to be described, it is a common feature that a small departure of arm PS from the 90° position is made to operate a control mechanism having the nature of a switch or escapement or servo mechanism whereby rotation of arm CP is caused, in such a sense that the departure is reduced. By this means it is achieved that the departure, during the whole of a traverse, is kept within a certain small amount either side of the 90° position, the accuracy of control being potentially greater than the accuracy obtainable from embodiments of Class 11.

In embodiments of Class 1 it is evident that (a) the tracking error is limited to the small amount which occurs when the departure is great enough to actuate the control mechanism and (b) side pressure is limited to the small amount which occurs when tracking error is at its greatest and (c) zero tracking error and zero side pressure are simultaneously achievable.

With reference to FIGURE 2, it has been noted that the best actual path of S, given that SP is a constant length and that P lies on both the properly-chosen circle and on the straight line SX, does not perfectly coincide with the ideal path namely a portion of the semicircle drawn on OX as diameter. In the present context the difference between the best actual path and the ideal path is ignored, and reference is made to imperfections caused otherwise than by this difference.

It is evident that if the distance OX were infinitely large the ideal path of S would be a straight line passing through O, that is, would be a radius of the disc. Also, if the spiral trace were of constant pitch and if (as is common practice) the disc rotates at constant speed, the linear speed of S along its path would be constant. When however the distance OX is finite (for instance, is of the order of magnitude suggested in FIGURE 2), the speed of S along its now curved path will vary. In common practice the pitch of the spiral trace also varies, and in an incalculable manner influenced at any point by the desired amplitude of modulation of the trace at that point. From this it follows that a second type of variation occurs in the speed of S along its path, this variation being of a random and incalculable nature. Hence it is evident that if the speed of rotation of arm CP is to be varied so as to maintain the angle PSO as a right angle, the speed cannot be varied according to any calculable law. In common practice however, the variation of pitch of the spiral is contained within certain known limits. Hence the variation of required speed of arm CP is also contained within certain consequent limits, this variation being caused partly by the fact that the path of S is curved and partly by the variation in the pitch of the spiral trace.

From a geometrical plotting of successive positions of S and P as S traverses the required path, and from considerations of the intervals of time between these positions, it can be established that by choosing a particular behaviour for arm CP as regards speed and amount of rotation, this behaviour being suited to the speed of rotation of the disc and to the extreme values of the pitch of the spiral trace, the maximum departure of arm SP from the 90° position during the whole of a traverse can be kept within a certain limit. In such a traverse the angle between the line SP and the tangent at S to the spiral is always small and tracking error is small and side pressure is small, and zero tracking error and zero side pressure are simultaneously compatible.

It is a common feature in embodiments of Class 11 that during a traverse the behaviour of arm CP as regards speed and amount of rotation is selected before the traverse begins and is not influenced by the behaviour of arm PS. The consequent departures of arm PS from the 90° position are accepted because of the comparative simplicity of the mechanism which is then possible.

In the descriptions that follow, certain reference planes, lines and points are defined for convenience, as follows:

PLANE D

The plane which, during operation contains the spiral trace on the disc (usually, a horizontal plane).

POINT O

The centre of the spiral signal trace, and the point where the axis of rotation of the disc meets Plane D.

POINT S

The point in Plane D where the centre of the stylus meets the spiral signal trace.

POINT X

A point in Plane D, fixed in relation to Point O and at such a distance from it that the semicircle drawn upon OX as diameter contains the chosen ideal path of the stylus as it traverses the disc.

AXIS X1

The straight line through Point X at right angles to Plane D (therefore usually a vertical axis).

POINT P

A point in Plane D about which the stylus arm rotates.

AXIS P1

The straight line through Point P at right angles to Plan D (therefore usually a vertical axis).

AXIS P2

The straight line in Plane D at right angles to the straight line PS (therefore usually a horizontal axis).

STYLUS PLANE

The plane containing Axis P1 and Point S (therefore usually a vertical plane).

CONTROL PLANE

The plan containing Axis X1 and Axis P1 (therefore usually a vertical plane).

In one Class 1 embodiment of the invention illustrated in FIGURES 1 to 7, the transducer with stylus S is mounted on an arm SPW (called "the stylus arm") so that by means of a sphere-and-tube pair, see FIGURE 6 (alternatively, a needle-and-diaphragm pair) it can rotate about axis P1 and axis P2. The weight of arm SPW is supported by a pair of wires K1, K2, spaced apart and held at their ends in a manner to be described. The portion PW of arm SPW is arranged to carry counterweights W1, W2, with riders 109 for fine adjustment, the centres of gravity of counterweight W1 being movable longitudinally and that of W2 transversely through clamping screws W2*a* and W2*b* so that (i) the tensions in the supporting wires can be equalised, (ii) the arm can be balanced about the supporting wires, and (iii) after balancing with the riders 109 in place, the pressure between the stylus and the disc can be adjusted in suitable small steps by the removal of successive riders 109.

Arm SPW carries, disposed in or near to and parallel to the Stylus Plane, a blade Q of electrically conducting material electrically insulated from the body of the arm and placed so that it can make electrical contact between wires R1, R2 described later. The exact position of blade Q in relation to the stylus plane can be adjusted (see FIGURE 4*a*) by rotation of screw 106 causing sliding of block 105 in a recess in the stylus arm. The transducer produces an electrical signal which is carried by leads (not shown) mounted on arm SPW and connected to wires R1, R2 described later. The exact position of blade in a cross-member (see FIGURES 3, 5) forming part of an arm RNY (called "the control arm"). This arm is provided with a hinge at H so that the portion RH can rotate relative to the cross-member. The portion HY constitutes one element of a sliding pair arranged so that the longitudinal axis of the arm is constrained to pass through Axis X1. In FIGURE 5 the first element of the sliding pair consists of the tubes 100*a*, 100*b*, in which slide bars 101*a*, 101*b*, forming the second element of the pair which are rotatable with boss 102 about Axis X1. At R is provided a pair of rotatable bosses 103*a*, 103*b*, in which are mounted wires R1, R2, of electrically conducting material, so disposed that their free ends are near blade Q.

By means of the bosses, the exact positions of the wires relative to one another and to the Control Plane are finely adjustable and capable of being fixed, for instance by springs 104*a*, 104*b*. The wires R1, R2 are electrically insulated from one another and from the body of the arm, and electrical leads to them are provided as part of an electric circuit to be described later.

It is evident that if there is resistance to rotation of the stylus arm about Axis P1 (such resistance being due to friction at the pivot or to other causes), then traversing of the stylus across the disc is accompanied by side pressure at the stylus (side pressure being the lateral force in Plane D as described earlier). In the present embodiment it is evident that apart from any friction at the pivot P, the stylus arm rotates freely except when blade Q is in contact with wires R1, R2: but by making these wires extremely fine, the corresponding side pressure can be made extremely small.

By flexing of the wires K1, K2, at their lower ends the stylus arm has freedom of rotation about Axis P2, sufficient to accommodate movement at right angles to Plane D when the stylus is traversing a disc that is warped and movement for handling the stylus arm before and after use. Also, Blade Q has sufficient length at right angles to Plane D to remain an effective contactor when a warped disc is being used. The hinge at H has sufficient length along its axis and sufficient accuracy, to ensure that the setting of wires R1, R2, relative to the Control Plane remains unaltered by the action of raising and lowering the control arm.

For handling the stylus and control arms before and after a traverse it is arranged that the stylus arm can be manually raised and lowered by screw L, which can be left holding the arm in a raised position. As an alternative to screw L there can be provided at the location of the screw L a lever to raise the arm positively by a pin or plunger, suitably co-operating with a spring acting upon a piston or vane in a viscous fluid dashpot mechanism of known familiar form mounted on the control arm so that upon movement in one sense of the lever the rear end of the stylus arm is depressed positively whilst upon release of the lever the stylus is permitted under the influence of the dashpot mechanism to descend slowly to engage gently with the trace whilst the pin or plunger moves upwardly and so that the pin or plunger itself moves further under the action of the spring to an extent sufficient at least to accommodate without interference the movement of the stylus when a warped disc is being used.

On the control arm is provided a stop J, so shaped that when the arms are in their operating positions the stylus arm has limited freedom of rotation relative to the control arm, first as regards Axis P1 sufficient to accommodate the movement of the stylus when it engages the eccentrically-formed grooves at the conclusion of a trace on commonly-used discs, and second as regards Axis P2 sufficient to accommodate the movement of the stylus when a warped disc is being used. As regards the first freedom, the eccentric grooves contain no signal and it is thus not necessary that tracking error and side pressure be small when the stylus engages them. As regards the second freedom, stop J is shaped so that manual raising of the stylus arm also raises the hinged portion of the control arm.

The suspension wires K1, K2, are mounted, suitably, in the manner shown in FIGURE 6. The lower ends are fixed, suitably by solder or wedges, in cups 110*a*, 110*b*, which are a close fit in holes in the stylus arm. The upper ends are similarly fixed in cups 111*a*, 111*b*, which are rotatable in externally-screwed bosses 112*a*, 112*b*. By rotating these bosses, separately or together, in screwed holes in the control arm the stylus arm can be adjusted as regards positional height and inclination. By rotating cups 111*a*, 111*b*, within the bosses, torsion in the suspension wires can be adjusted and it can be arranged that when the stylus arm is balanced about the suspension wires and hangs freely at rest, the Stylus Plane coincides with the Control Plane. Bosses 112*a* and 112*b* have a radial cut of sufficient thickness to pass wires K1 and K2 thus permitting the bosses to be inserted after the wires complete with the cups 111*a*, 111*b*, have been passed through the holes in the control arm.

If, as happens in the case of stereophonic reproduction, more than two conductors are required for the electrical signal from the transducer, addition conductors can be provided between the stylus arm and the control arm in the form of wires (see FIGURE 6), such wires 113*a*, 113*b*, being suitably coiled or otherwise shaped to ensure that they do not significantly assist in supporting the weight of the stylus arm. The lower ends of these wires may be electrically connected to conductors attached to the stylus arm or may dip into reservoirs of a liquid conducting material, for instance mercury, contained in recesses formed in or attached to the stylus arm.

It is evident that since in operation the rotation about Axis P1 of the stylus arm relative to the control arm is limited to the small amount permitted by stop J, the side pressure at the stylus caused by twisting of and departure from the vertical of wires K1, K2, and of additional wires 113*a*, 113*b* if used, can be made extremely small.

The weight of the control arm, including the weight of the stylus arm carried by the suspension wires K1, K2, is supported at N (see FIGURE 3) by the arm CP (called "the slave arm"). The control arm can rotate on the slave arm about Axis P1. The slave arm carries a shaped stem M which terminates in the sphere of a sphere-and-tube pair (alternatively, which terminates in the needle of a needle-and-diaphragm pair) so disposed as to establish the rotation of the stylus arm about Point P.

The slave arm, suitably shaped so as to provide clearance over the whole range of permitted positions of the control arm and stylus arm, is arranged to rotate about an axis through Point C at right angles to Plane D, Point C being a point in Plane D fixed relative to Point O and Point X and chosen so that the controlled path of stylus S as it traverses a disc is a good approximation to the chosen ideal path. By means of external power, electrical connections, and gearing, it is arranged that rotational drive is imparted to the slave arm when wires R1, R2, are connected by blade Q, the rotation being in such a sense that the tendency is to disconnect wires R1, R2, and it is arranged that correspondingly the drive becomes disconnected when wires R1, R2, are disconnected. Alternatively it is arranged that drive is imparted when wires R1, R2, are disconnected and that drive becomes disconnected when wires R1, R2, are connected.

From either of these arrangements can be seen the basis of a mechanism whereby a small departure in a first sense of the stylus arm from a mean position produces a rotation of the slave arm tending to reduce or cancel that departure or to cause a departure in a second sense opposite to the first sense and of amplitude no greater than that of the first departure. By the precise relationship chosen between wires R1, R2, and the Control Plane and between blade Q and the Stylus Plane, it can be arranged that the successive small departures of the stylus arm from a mean position are equally disposed about that position and that the mean position coincides with or is a close approximation to the 90° position. It can be seen that if a control means could be devised which was actuated by infinitesimal departures of the stylus arm from the 90° position, an ideal condition would be obtained in which, during the whole of a traverse, the Stylus Plane and the Control Plane remained coincident.

The slave arm and control arm are moved by external power and their movement is required to have the smallest possible influence upon movement of the stylus arm, with the sole exception that movement of Point P is necessary in order that the stylus may describe the required path. By minimising during operation all effects of friction, torque or other constraints on the stylus arm imposed by the pivot or by wires K1, K2, 113*a*, 113*b* or by the control means, the stylus arm is isolated to the greatest possible degree from the control arm and the slave arm It is not however a stringent requirement that incidental frictions, torques or constraints should be minimised elsewhere, since external power can be used other than upon the stylus arm, without detriment to the performance of the apparatus.

It is seen that rotation of the slave arm causes a sliding in the sliding pair between N and X. By virtue of good fit in the sliding pair it is ensured that the axis RNY of the control arm passes always through Axis X1: hence in operation the free ends of wires R1, R2, remain displaced by a fixed amount (according to their chosen setting) from the Control Plane, and this amount can if desired be zero.

The switching action of blade Q is, suitably, made to operate an electric relay of known familiar form having a switching action in a second circuit. This second circuit includes, suitably, a source of electric power and an electric motor 114 which is the driving means for the slave arm. The switching action of the relay can however be coupled to other driving means, for example a spring-wound motor or a gravity motor. By interposing a relay between the switching action of blade Q and the switching action required for the driving means, it can be arranged that the electric voltage and current at blade Q are small, thus reducing any possible electric or magnetic disturbance of the working of the transducer and any damage to contactors due to sparking. The interposition of a relay is not however essential.

The driving means for the slave arm can be, suitably, a mains-driven synchronous motor of a non-reversing type as commonly used in electric clocks. The driving means is connected to the slave arm through a train of orthodox gearing containing a speed-change mechanism whereby the speed of the slave arm can be selected to be suitable for using the apparatus with a disc rotating at any of the commonly-used speeds: and similar provision can be made for suitability for use with a disc rotating at any speed which may be commonly used in the future.

It is clear that if the arrangement chosen is that connection of wires R1, R2, causes rotation of the slave arm, then if wires R1, R2, are connected at a time when no power is supplied to the driving means, the slave arm will not rotate: and equally that if power is supplied to the driving means otherwise than by connection of wires R1, R2, the slave arm will rotate. Correspondingly if the arrangement chosen is that connection of wires R1, R2, causes cessation of drive to the slave arm, then if wires R1, R2, become disconnected at a time when no power is supplied to the driving means, the slave arm will not rotate: and equally if power is supplied to the driving means otherwise than by disconnection of wires R1, R2, the slave arm will rotate. Hence it is evident in the case of either arrangement that there is casual relationship between the presence, due to actuation of the control means, of side pressure at the stylus and a change of state of the slave arm as regards the imparting and removal of drive, but that the force required to rotate the slave arm is in no part transmitted through the stylus.

By choice of the exact setting of the free ends of wires R1, R2, in relation to the Control Plane and to the leading or the rearward face respectively of blade Q, it can be arranged by suitable electrical connections either (i) that the slave arm is driven when wires R1, R2, are connected and not at other times, or (ii) that the slave arm is driven when wires R1, R2, are disconnected and not at other times. In case (i) the wires require to meet the leading and in case (ii) the rearward edge of blade Q.

It is evident that if the speed of the slave arm were matched with sufficient accuracy to the speed of the stylus throughout a traverse it would be possible for the slave arm to be in continuous motion simultaneously with maintenance of the desired control of the angle PSO. However, for a number of reasons including the use of discs having a variable pitch of the spiral trace and the use of discs in which the centre of rotation does not perfectly coincide with the geometrical centre of the spiral trace, perfect matching is not in general to be expected and rotation of the slave arm during a traverse is likely to be intermittent. It is also evident that since a pressure is required between the stylus and the disc acting at right angles to the disc, Point P does not coincide with the centre of gravity of the stylus arm. Hence, when Point P is accelerated or decelerated by rotation of the slave arm, a side pressure at the stylus is caused. For this reason, the number and magnitude of accelerations and decelerations of Point P require to be minimised. For this purpose, the speed ratios available from the speed change mechanism require to be chosen so that the number of switching actions occurring during a traverse is the smallest possible compatible with adequate control of the angle PSO. A further degree of matching of the speed of the slave arm to the speed of the stylus can be achieved by suitable choice of the magnitude of the moment of inertia of the rotating parts of the driving means and the gearing train, since by such choice the acceleration and deceleration of the slave arm at times of respectively presence and absence of drive can be made suitable.

For handling the apparatus before and after a traverse it is arranged by means of a dog clutch or friction clutch or torque limiter forming part of the transmission train between the slave arm and the driving means that the slave arm can be rotated manually without corresponding rotation of the whole of the transmission train. By this arrangement when the stylus arm and control arm are held raised, for instance by screw L, the slave arm can be rotated without damage to any part. Thus at the conclusion of a traverse, by rotation of the slave arm the control arm can be returned to a rest position and, by virtue of stop J, the stylus arm is constrained to return simultaneously to the rest position. In this position the arms are held conveniently clear of the disc. Similarly at the beginning of a traverse, by manual rotation of the slave arm, the control arm and stylus arm can be moved so that the stylus registers with the beginning of or with any other desired portion of the spiral trace. For locating the stylus accurately in register with a particular point, it may be the beginning, of the spiral trace, a subsidiary manual drive effected through suitably gearing or friction and giving a useful reduction ratio of speed can be provided to engage when desired with the slave arm, so that very small rotations of the slave arm can be conveniently achieved.

In the electrical connections to wires R1, R2, and to the output side of the relay if a relay is used, switches are provided to isolate the apparatus from the external electric supply.

In FIGURE 7 is illustrated one method of connecting the driving means to the slave arm. Here, a commercially-available type of electric motor 114 is used, driving a friction wheel 115 through orthodox gearing giving a suitable reduction ratio. Coaxially opposed to wheel 115 and at a fixed distance from it is a similar friction wheel 116 which is connected to worm 117. Engaging with worm 117 is wormwheel 118 which is fixed on the axle 130 of disc 131.

Drive from wheel 115 to wheel 116 is provided by a pair of coaxially-mounted discs **117*a*, 117*b*, which in order to provide frictional force for drive can be pressed towards one another by non-rotating discs 118*a*, 118*b*, and ballraces 119*a*, 119*b*. Inward pressure is transmitted by tension in spindle 120 attached to disc 118*b* and by compression in sleeve 121 which can slide on spindle 120 and can compress spring 122. Compression or release of spring 122 is controlled by the rocking lever 123 which is pivoted on spindle 120 and has cam surfaces bearing on the upper end of sleeve 121**.

Spindle 120 is mounted in frame 124 which can slide collinearly with the axis of wheels 115, 116, against guides **125*a*, 125*b*, its movement being controlled by rotation of cam 126 which is mounted on spindle 127. It is evident that the position of spindle 120 in the space between wheels 115, 116, controls the speed-ratio of drive between these wheels. Hence, manual rotation of wheel 128 which is mounted on spindle 127, can, by the reading of pointer 129 against scale 149, be used to give known speed-ratios; and by suitable shaping of cam 126, equally-spaced calibrations on scale 149 can be made to correspond to approximately equal changes of speed-ratio. The purpose of providing pressure-release by lever 123 is to avoid excessive wear in the friction drive surfaces while frame 124 is being moved, and if desired an interlock can be arranged so that wheel 128 cannot be turned while lever 123** is in the pressure transmitting position.

The axle 130, which bears at its lower end in plate 132 and at its upper end is located in axle 135, is coaxial with axle 135 which is the axle of the slave arm, the common axis being a line through Point C at right angles to Plane D and for convenience called Axis C1. Supporting the control arm at N is the shaped stem M carried in the shaped and stiffened bracket 136 fixed to axle 135. Providing lateral but not axial restraint for axle 135 is bracket 137 (see FIGURE 3) which is fixed to plate 134. At the foot of axle 135 is fixed stiffened bracket 138 which carries pad 139 of friction material. This pad is centred on Axis P1 and bears against disc 131. Brackets 136 and 138, with stem M and pad 139 and axle 135, constitute the essential parts of the slave arm.

The weight supported by pad 139 is transmitted, as the pad describes its arcuate path, by wheels or rollers **148*a*, 148*b*, 148*c*, which are mounted in openings in disc 140 at spacings suited to the arcuate path. Disc 140 is supported partly on axle 130 and partly on pillars 141*a*, 141*b*, 141*c*, 141*d*, which are mounted on plate 132**.

It is arranged that axle 130 is located by but does not give axial support to axle 135: hence the weight carried at N is transmitted to pad 139 and thus provides the frictional force for the drive of the slave arm by disc 131.

For manual rotation of the slave arm there are provided first wheel 142 mounted on axle 135, second wheel 143 rotatable on stem M, and third wheel 144 mounted on spindle 145 and having a small stem shaped to bear when desired against wheel 142 so as to provide frictional drive and a large reduction ratio of speed. Spindle 145 is located in plate 134 and passes through a slot in bracket 137 shaped so that wheel 144 is normally held out of action by the pressure of spring 146.

The amount of travel of frame 124 is arranged so that the variation of speed ratio obtainable from the continuously-variable drive in such that, in conjunction with the ratio obtained from the invariable gearing the slave arm can have a range of speeds sufficient for use with all commonly-used types of disc and with all commonly-adopted variations of pitch of the spiral trace.

Although in this embodiment the gearing includes a continuously-variable element, such element is not an essential feature of embodiments of Class 1 and gearing providing a choice of a number of fixed-ratio drives would suffice, the fixed ratios being suited to the individual types of commonly-used disc. In the embodiment as described, suitable preferred ratios can be obtained by providing a number of click-stop positions for wheel 128. Worm 117 and wormwheel 118 can be replaced by spur gears with or without the inclusion of bevel gears if it is found convenient, for instance in order to achieve a particular speed-ratio in combination with the characteristic of free over-run, to avoid a worm drive.

Briefly described, a framework for the moving parts is provided in the form of three plates 132, 133, 134, of which the top plate 134 is supported above the baseboard of the general apparatus, suitably on adjustable feet so that the designed Plane D of the embodiment can be made to coincide with the plane of the spiral trace in the general apparatus. Plates 132 and 133, spaced apart, suitably by pillars or by through-rods with sleeve spacers, are together supported from plate 134 and lie below the baseboard, which is pierced to pass the various supports and spindles. Pillar 147, providing a stub axle centred on Axis X1 for boss 102, is fixed to plate 134, suitably to be coaxial with one of the plate support pillars.

It will be seen that the limited range of relative positions of the transducer or stylus arm and control arm as permitted by the shaped stop J in respect of rotation about Axis P1, consists of two portions which for convenience are called "the drive range" and "the null range."

The drive range and the null range are the ranges of relative positions in which the actuator elements of the control means are placed so as to cause, respectively, the presence and the absence of drive to the slave arm. It is evident that these terms can be applied to the limited range irrespective of the exact positions of the chosen settings of the actuator elements relative respectively to the Stylus Plane and the Control Plane.

At the beginning of a traverse of the whole of or part of a spiral trace, at the moment when the stylus is made to engage the trace the transducer or stylus arm may be in either the drive or the null range.

In the former case, the effect of the consequent rotation of the slave arm is that the control arm moves in the direction such as to transfer or to tend to transfer the transducer arm to the null range. The amount of time which elapses before this transfer occurs depends upon (inter alia).

(i) the amount of the drive range which, at the moment arms of engagement, separates the then positions of the arms from the null range,
(ii) the magnitude of the acceleration of the slave arm when drive is imparted,
(iii) the magnitude of the pitch of the spiral trace.

From this it is evident that the greater is the proportion of the time of the traverse that the arms pass in the drive range the better is the performance of the apparatus.

It is part of the design of the apparatus that the maximum speed of the slave arm obtainable when an appropriate reduction ratio in the gear train has been selected, is sufficient to ensure that in portions of the spiral trace where the pitch may continue at the maximum adopted pitch in commonly-used discs, transfer from the drive range to the null range can occur and can occur in combination with adequate control of the angle PSO.

From this it follows that either at or soon after the moment of engagement of the stylus, the transducer or stylus arm will be in the null range. In the consequent absence of drive to the slave arm, the movement of the stylus as it follows the spiral trace will, after an interval of time, transfer the transducer arm to the drive range.

From this behaviour can be seen a pattern of behaviour, for convenience called "cyclical behaviour," whereby during a traverse the desired control of the angle PSO is maintained by a combination of:

(i) manual selection, before the traverse, of an appropriate maximum speed to be obtainable from the slave arm, and
(ii) automatic actuation, during the traverse, of the control means.

It is evident that if the speed of the slave arm is very favourably matched to the speed of the stylus as it follows the spiral trace, it is possible for one cycle or less than one cycle of cyclical behaviour to occupy the whole traverse.

In another embodiment illustrated in FIGURES 8*a* to *e*, the switching action of wires R1, R2, and blade Q is effected instead by a reed switch 150, suitably of a type operating in an inert gas contained in a compact envelope of glass or other material, having its contactors operated by the movement of a magnet 151. The reed switch 150 is mounted on the control arm and the magnet, suitably a permanent magnet since such is self-contained and requires no external conductors, is mounted on the stylus arm. The reed switch and the magnet 51 are relatively so disposed and oriented that the switch is sensitive to small relative movements about Axis P1 of the stylus arm and the control arm. The exact setting of the switch 150 in a direction at right angles to the Control Plane is made finely adjustable and capable of being locked by means of screw 152 and the sliding of block 153 to which the switch is attached. The exact setting of the magnet 151 longitudinally, transversely and in inclination is made finely adjustable and capable of being locked by means of screw 154 mounted on frame 155 which can pivot about screws **156*a*, 156*b***, passing through slots in the stylus arm.

Hence the setting of the switch in relation to the Control Plane and the setting of the magnet in relation to the Stylus Plane are under accurate control and can be chosen to give the same conditions for cyclical behaviour during a traverse as have been described for the previous embodiment and the same result, namely that successive small departures of the stylus arm from a mean position are equally disposed about that position and that the mean position coincides with or is a close approximation to the 90° position.

In this embodiment it is evident that no bodily contact between the two arms is required in order to achieve switching action and that side pressure at the stylus insofar as such as caused by the control means is caused only by constraint arising from such magnetic material in the control arm as is near to the magnet. By choice of size and shape the magnet can be made to have only a small external field, and such parts (other than the switch) of the control arm as lie within the measurably effective range of the magnet can be of non-magnetic material.

Hence under these conditions the amount of side pressure caused by magnetic interaction can be made extremely small.

It is also evident, in particular, that although transducers producing electrical signals commonly contain magnetic material, there is in operation no relative movement between the magnet and the transducer or the transducer arm and that therefore there is between these parts no interaction tending to cause side pressure at the stylus, Electrical leads from the reed switch are mounted on the control arm and pass thence to the driving means or to the relay if a relay is used.

In another embodiment illustrated in FIGURES 9*a* to *f*, the switching action of wires R1, R2 and blade Q is effected instead by photoelectric means. In this embodiment, a photoelectric cell 160, a light-source and an optical slit are mounted coaxially on the control arm and an optical shutter 163 is mounted on the stylus arm. These parts are so disposed that respectively passage and interruption of a beam of light directed from the source through the slit and towards the cell are sensitively controlled by small rotations about Axis P1 of the stylus arm relative to the control arm.

The cell 160 is mounted within the light-excluding holder 164 which is fixed to tube 165. The sliding shutter 166 contains an optical slit having its major dimension parallel to Axis P1 and capable of being finely adjusted in position in a direction at right angles to the Control Plane and of being locked by means of screw 167 which is mounted in holder 164. At the other end of the tube 165 is mounted holder 168 which contains a light-source and if required lenses, producing a substantially parallel beam of light directed along the tube. The axis of the tube lies in the Control Plane and is parallel to Plane D. Through an opening in holder 164 passes optical shutter 163 so as to lie between cell 160 and shutter 166. Shutter 163 is fixed to block 169 which can slide against the stylus arm, rotation being prevented by the engagement of a protrusion on the arm with a mating recess in the block. The operating edge of shutter 163 is parallel to Axis P1 and the position of this edge can be adjusted in a direction at right angles to the Stylus Plane and be locked by means of screw 170 which is mounted in the stylus arm.

The photoelectric cell is, suitably, of a type the electrical resistance of which varies sharply according to the amount of light falling upon it. Electrical leads from the cell are mounted on the control arm and pass thence to an electric relay and through an isolating switch to a suitable source of power. The output side of the relay is connected to the driving means as part of the second circuit previously described. Electrical leads from the light-source are mounted on the control arm and pass thence through an isolating switch to a suitable source of power.

With this arrangement it can be seen that for a certain range of positions of the stylus arm relative to the control arm, the full beam of light passing the optical slit falls upon the cell and that for another range of positions the ray is fully interrupted by shutter 163. Between these ranges is a range of positions in which a small movement of the stylus arm relative to the control arm makes a large difference in the amount of light reaching the cell (extraneous light being deemed, in this context, to be all excluded by holder 164). This range is for convenience called the "sensitive" range. It is evident that by choice of the exact setting of the operating edge of shutter 163 in relation to the Stylus Plane and of the exact setting of the slit in shutter 166 in relation to the Control Plane, it can be achieved that the same conditions for cyclical behaviour during a traverse are given as have been described for the embodiment of FIGURES 1 to 7 and also that the sensitive range can be placed so that successive small departures of the stylus arm from a mean position are equally disposed about that position and so that the mean position coincides with or is a close approximation to the 90° position.

In this embodiment it is evident that switching action is obtained without bodily contact and without magnetic interaction between the control arm and the stylus arm and that operation of the control means causes no side pressure at the stylus.

It is also evident that various combinations of arrangement of the various parts are possible, giving various switching actions. For instance, if the body of shutter 163 lies on the rearward side of the Stylus Plane, that is to say, if the operating edge of shutter 163 is the leading edge, then the cell will (broadly speaking) be lit when the angle PSO is less than 90° and will be dark when the angle PSO is greater than 90° In this case the relay and its connections require to be such that the slave arm is driven when the cell is dark and not driven when the cell is lit. Conversely if the operating edge of shutter 163 is the rearward edge, the relay and its connections require to be such that the slave arm is driven when the cell is lit and not driven when the cell is dark. These results can be achieved by suitable combination of a relay of which the output contacts are closed when the input contacts are closed or alternatively open, with a cell of which the resistance decreases or alternatively increases with increasing amount of incident light.

In the embodiments previously described, it has been a feature that axle 130 geared to the driving means is centred on Axis C1 being the axis of the slave arm. From this feature results the behaviour that during operation the slave arm has the same speed of rotation as disc 131. However by offsetting axle 130 from Axis C1 it can be achieved that during operation a constant speed of rotation of disc 131 produces a varying speed of rotation of the slave arm, this condition being accompanied by some slipping of pad 139 on disc 131.

By choosing the offset to be suitable in amount and direction it can be achieved that the variation in speed of the slave arm matches or assists in matching the desired variation which, as previously described, arises in both ideal and actual conditions from the fact that the path of the stylus across the disc is curved. Hence by suitable choice of offset, an improvement can be obtained in the minimising of the number of switching actions that occur during a traverse.

For convenience, such a drive arrangement whereby a constant speed of the driving means produces during operation a wanted variation in the speed of the slave arm is called a "non-linear element."

In the above description the non-linear element is provided at the place in the transmission train where arrangement is made to allow the slave arm to be manually rotated without causing rotation of the whole of the transmission train. However these functions are separable and if the transmission train is regarded as consisting of two portions, first a continuously-rotating portion at the driving end and second a manually-operable and reciprocable portion at the slave arm end in which the wanted variation of speed is applied to a known and limited arc of rotation, it is clear that a non-linear element may be provided, for instance by means of cams or linkage, at any convenient stage in the second portion provided that where the two portions are connected, a clutch or torque-limiter or other slipping device as previously mentioned is provided.

In the embodiments previously described, it is a feature that a driving means is provided, adapted so that under the action of the control means it can impart and cease to impart drive to the slave arm. However in the apparatus accompanying the invention and used for rotating the disc, there exists a driving member, usually an electric rotary motor, which is in motion throughout the traverse of the stylus across the disc. Hence as an alternative to the provision of a separate driving member, it can be arranged that the switching action of the control means it made to effect connection and disconnection between the driving member of the disc and the slave arm. An electromagnetic clutch of known familiar form is a suitable means of obtaining this effect, the clutch being mechanically interposed between the disc driving member and the slave arm, and being electrically connected to the actuator elements of the control means either directly or through a relay of the same type as in previous embodiments and, through an isolating switch, to a suitable source of electric power. It is clear that the clutch can be placed at any suitable stage between the driving member and the slave arm provided that it is not placed on the driven side of the stage where provision is made for manual rotation of the slave arm to occur without consequent rotation of the whole of the transmission train. In particular, since by means of the isolating switch the clutch can conveniently be put into the disengaged state at any time after or before a traverse, the clutch can form the slipping device required for such provision.

It is also clear that with this arrangement, the force required for movement of the slave arm is in no part transmitted through the stylus.

To obtain optimum reproduction from a transducer of the kind referred to, the movement of the stylus relative to the body of the transducer requires to be caused solely by the shape of the signal contained in the spiral trace. It must be accepted however that to some degree unwanted extraneous movement will be imparted, in particular by the driving means of the disc, to the framework and therefore to the control arm of the embodiment and that consequently because of the compliances of the stylus relative to the body of the transducer a corresponding degree of imperfection of reproduction will occur.

It is a known characteristic that for a given amplitude of spurious or unwanted movement, the disturbance is more harmful if the movement is sudden and short in nature than if it is comparatively smooth and prolonged. It is evident that in the embodiments previously described in which control is effected by a switching action having only two states, that is to say, "make or break" or "open or closed," the effect of inertia of the moving parts connected to the slave arm can be that the arm, once put in motion at the beginning of a traverse, remains in motion until the end. Continuity of motion is desirable, but the use of a driving means rotating at a fixed speed sets a limit to the degree of matching which, without mechanical control during a traverse of the speed-ratio obtained from the transmission train, can be achieved between the speed of the stylus and the speed of the slave arm. This matching can be improved and to this end the control means having the nature of a switch with only two states is replaced by a control means having the nature of a modulator, and a driving means is provided of a type such that its speed can be varied by the control means.

In the embodiment illustrated in FIGURES 9*a* to *f* it is evident that although the switching action in the output side of the relay is sudden, the changes in the input side are gradual since they are caused by variation in the amount of light falling upon the cell, this variation being itself gradual because of dispersion and scattering of the beam of light. The degree of gradualness can be altered by various methods, for instance:

(a) The operating edge of shutter 163 and the major dimension of the slit in shutter 166 instead of being parallel can be set oblique to one another so that relative movement parallel to Plane D causes gradual variation in the amount of light incident upon the cell, or (b) The slit in shutter 166 instead of being rectangular and the operating edge of shutter 163 instead of being straight and parallel to Axis P1 can be respectively tapered or curved, and oblique or curved, so that the amount of light incident upon the cell may be related to the position of the slit and of the operating edge within the sensitive range according to any desired law.

The photoelectric cell is, suitably, of a type whose electrical resistance varies sharply according to the amount of light incident upon it. This variation of resistance is used, suitably, to obtain from an electrical amplifier of known familiar form a varying output, such output being used as a means of varying the speed of an electric motor which is the driving means of the slave arm.

The transmission train between the driving means and the slave arm contains a speed-change mechanism of the type previously described, whereby the speed-ratio of the train can be altered manually so that the speed of the slave arm is coarsely adjusted to suit a disc rotating at one or other of the commonly-used speeds. Fine adjustment of speed, effected by the control means described above, can thus be superimposed upon any coarsely-adjusted speed selected by means of the speed-change mechanism.

With this arrangement can be obtained from the embodiment an improved performance as regards minimizing the number and magnitude of accelerations and decelerations of Point P during a transverse and as regards minimizing the amount and duration of departures of the stylus arm from the 90° position.

The embodiment now described is illustrated in FIGURE 10, falls in Class 11 and substantially resembles the embodiment of FIGURES 3 to 7 of Class 1 previously described insofar as the driving means, the transmission train and the slave arm are concerned. The stylus arm and control arm also substantially resemble the corresponding arms of that embodiment but are simplified by the omission of means for obtaining switching action.

In the present embodiment, the control arm carries instead of wires R1, R2 and bosses 103*a*, 103*b*, a fixed pointer 190 longitudinally disposed in the Control Plane so as to register against a fixed scale 191 disposed parallel to Plane D mounted on the stylus arm. The scale is calibrated so as to indicate by readings of the pointer the magnitude of departures of the stylus arm on either side from the 90° position.

Provision is made that the wheel 128 controlling the speed-change mechanism in the transmission train can be set by means of a number of click-stop positions to produce in the slave arm speeds of rotation which are suitable for using the apparatus with discs rotating at commonly-used speeds and having a notional constant pitch of spiral trace, such notional pitch being a suitable averaged value representative of the actual varying values on commonly-used discs. By this arrangement it is achieved that by setting wheel 128 to the click-stop position which is suitable for a particular disc, the performance of the apparatus during a traverse of that disc will be good as regards the minimizing of departures of the stylus arm from the 90° position, taking account of both magnitude and duration.

It is evident that the performance in these respects can be assessed by watching the behaviour of the pointer against the scale during a traverse, and that because of unpredictable and incalculable variations in the pitch of the spiral trace as between different parts of any one disc and between one disc and another, it is probable that with any particular disc an improved performance can be obtained by setting the pointer to a position displaced from the click-stop position. Hence, for any particular disc, there can be found by trial and error a speed of the slave arm which is assessed to be best in terms of minimizing the amount and duration of departure of the stylus arm from the 90° position. Once found, this speed can be reproduced when desired by setting the pointer to the appropriate scale reading.

The pointer on the control arm does not touch the scale on the stylus arm and during a traverse the presence of the control arm has no influence upon the behaviour of the stylus arm otherwise than to improve performance by ensuring that cumulative twisting of and departures from the vertical of wires K1, K2, 113*a* and 113*b*, with consequent side pressure at the stylus do not occur.

It is evident that rotation of the disc and rotation of the slave arm are independent rotations each of which can occur with or without the other and that the force required for movement of pivot-point P of the stylus arm is in no part transmitted through the stylus.

It is also evident that the non-linear element in the transmission train described for an earlier described embodiment can be applied to the present embodiment with .he same purpose and with corresponding improvements in performance.

It is clear from the description of the previous embodiment that in order to obtain good performance with all discs it is desirable that the speed of rotation of the slave arm should be continuously variable at will. In the previous embodiment the driving means had a constant speed of rotation and the transmission train included a continuously-variable element which was manually controllable. It is evident however that the same purpose can be achieved by a driving means having variable speed of rotation driving a transmission train of invariable ratio, provided that the speed of the driving means is manually controllable.

Thus there can be provided a driving means, suitably an electric mains-driven motor of a type whose speed can be conveniently varied over the desired range by the adjustment of a variable resistor connected in series with the motor, and which has such a resistor so connected which has suitably a control wheel or control slider the movement of which is registered by a pointer against a divided scale. Alternatively the driving means may be an electric or spring-wound or gravity motor of a type whose speed can be conveniently controlled by variation of setting of a mechanical speed-governor of known familiar form, the setting being similarly registered by the reading of a pointer against a scale. In all cases it is arranged by means of a number of click-stop positions of the speed control means that certain speeds of the slave arm can be obtained at will. It is evident that with this arrangement the process of trial, error and assessment of best performance can be applied to individual discs as previously described and can achieve the same desired result.

In all the embodiments previously described, it has been a common feature that the path of Point P is a circular arc. Acceptance of the difference between this path and the ideal path enables the mechanism to be simpler. However if greater accuracy is required, the actual path of Point P can be made to coincide with the ideal path, the latter being (as already described and with reference to FIGURE 1) easily determined for any particularly values of the lengths OX and SP as S traverses the relevant portion of the semicircle drawn on OX as diameter, with P lying always on the straight line SX.

This greater accuracy is achieved by the arrangement illustrated in FIGURES 11*a* and 11*b* in which a laminar cam 180 is provided, disposed parallel to Plane D, the cam profile being such that when traversed by a roller follower 181 mounted on the shaped stem M, the path of Point P is the required ideal path. The cam is mounted upon and fixed relative to the framework of the apparatus and the follower is, suitably, mounted concentrically on stem M as axle.

The cam 180 is mounted on bracket 137 which as previously described provides, by means in this case of extension bracket 185, lateral but not axial support for the axle 135 of the slave arm. The upper bracket 136 of the slave arm terminates in a pair of sliders 182*a*, 182*b*, which engage, in close fit, block 183 in which stem M is fixed. On stem M as axle is mounted the circular roller follower 181 which is kept in contact with the cam by tension in spring 184. Block 183 thus has limited freedom to slide relative to the slave arm, and the direction of sliding suitably, coincides with or is near to the direction PC. The direction of tension of spring 184 also, suitably, coincides with or is near to the direction PC.

It is evident that by suitable choice of Point C in relation to Points O and X the operative edge of the cam can be made very nearly a circular arc centred at C and that consequently the amount of sliding of stem M relative to the slave arm can be very small.

The presence of the cam and the follower and the described consequent sliding does not affect the sequence previously described of cause and effect whereby during a traverse adequate control of the angle PSO is maintained.

The following structural features of the various embodiments are especially to be noted in addition to the essential features of the invention arising from the geometrical relationship between the stylus and slave arms:

(1) The stylus arm is pendently mounted on the control arm by means of spaced vertical wires K1, K2, which allow limited rotational movement of the stylus arm about Axis P1 and Axis P2, while preventing rotation about the line PS.

(2) Movement of the stylus arm is constrained by a sphere-and-tube pair at Point P. This pair permits rotation of the arm about Axis P1, limited rotation about Axis P2 and the line PS, and limited translation along Axis P1. It is seen that the sphere is carried on a stem supported on the slave arm and that the tube consists of a bore centred on Axis P1 through the stylus arm.

(3) The centre P of rotation of the stylus arm is located in Plane D in order that variation in frictional drag between the stylus and the disc shall not cause variation in the pressure between the stylus and the disc at right angles to the disc.

(4) If the transducer produces electrical signals, the signals can be conducted wholly or partially from the stylus arm by the suspension wires K1, K2. By this means such conduction causes no additional restraint to the rotation of the stylus arm.

(5) A switching or modulating action is obtained by means which may be mechanical, electrical, magnetic or photoelectric in nature or may be of other nature. The switching or modulating action is so adapted that upon rotational deviation of the stylus arm in a first sense from a mean position, drive is imparted to the slave arm so as either to reduce or cancel the said deviation or to cause a deviation in a second sense opposite to the first sense and of no greater magnitude than the deviation in the first sense.

With reference to Note 2 above, the same degree of constraint can be obtained by a needle-and-diaphragm pair; the needle being centred on Axis P1 and attached to the slave arm and the diaphragm being a thin sheet of tough and, suitably, slightly resilient material lying in Plane D and attached to the stylus arm and pierced at Axis P1 to admit a portion of the needle.

Alternatively the diaphragm element of the pair may consist of two pairs of fine wires disposed, suitably at 90° to one another and at 45° to the Stylus Plane, the wires of each pair being stretched in contact with one another across an opening in the stylus arm and secured thereto under tension with the pairs lying in Plane D and intersecting at Axis P1. Thus by inserting the needle between the wires of each pair there is provided a means of the desired constraint, sufficiently strong and with a suitable slight degree of resilience.

It is evident that although the sphere of the sphere and tube pair or the needle of the needle and diaphragm pair have been described as being mounted upon the slave arm—and in that case will rotate relative to the control arm—the said elements can without altering the performance of the apparatus be mounted upon the control arm and in that case will rotate relatively to the slave arm.

I claim:

1. A mounting for a transducer having stylus means for engaging a spiral trace containing a signal formed on a rotatable disc comprising a transducer arm on which the transducer is carried, a slave arm mounted for rotational movement parallel with the plane of the disc and on which the transducer arm is supported for movement in relation to the slave arm about an axis normal to the plane of the disc, sensing means located between the stylus means and the axis, normal to the plane of the disc, of rotation of the transducer arm and adapted to sense departures of the line in the plane of the disc joining the point of contact of the stylus means and the disc to the axis normal to the plane of the disc of rotation of the transducer arm from the position in which said line is tangential to the spiral trace at the stylus means, and drive means for driving the slave arm in its path of rotational movement as the stylus means traverses in a curved path a spiral trace on the disc, the dimensions of the slave arm and its path of rotational movement being such that during the traverse of the stylus means the said line in the plane of the disc lies on or close to the tangent to the spiral trace on the disc at the stylus means whilst the transducer is located so that the said line is disposed normal or substantially normal to the plane of vibration of the stylus.

2. A mounting as claimed in claim 1, wherein a control arm is mounted for rotation about an axis normal to the disc, and, at a location spaced from said axis is connected to the transducer arm at a point thereof remote from the stylus means, the length of the control arm between said axis and said location being freely variable and the sensing means having co-operating elements respectively carried on the control arm and the transducer arm.

3. A mounting as claimed in claim 2, wherein the transducer arm is supported from the control arm by at least one pair of spaced wires extending parallel and coplanar with and on respective opposite sides of the axis, normal to the plane of the disc, of the rotational movement of the transducer arm.

4. A mounting as claimed in claim 3, wherein the plane containing the pair of wires is normal to the line in the plane of the disc which joins the axis of rotation of the control arm with the axis, normal to the disc, of rotational movement of the transducer arm.

5. A mounting as claimed in claim 4, wherein the transducer arm is supported by the pair of wires and in relation to the slave arm so as to be rotatable about an axis in the plane of the disc and lying in the plane containing the wires.

6. A mounting as claimed in claim 3, wherein at least one of the wires is rotatably mounted so that by adjustment of the torsion in the wire the position of rest relative to the control arm of the stylus arm can be adjusted.

7. A mounting as claimed in claim 3, wherein at least one of the pair of wires is used as an electrical conductor.

8. A mounting as claimed in claim 2, wherein stop means are provided on the control arm which co-operate with the transducer arm to limit rotational movement of the transducer arm about the axis thereof normal to the plane of the disc to such movement relative to the control arm as is required of the transducer arm when the stylus engages a spiral trace in a disc.

9. A mounting as claimed in claim 2, wherein the control arm and transducer arm are provided with respective co-operable indicating means whereby the relative positions of the said arms are observable so that the drive means can be continuously driven at a speed to effect such movement of the slave arm as the stylus traverses a spiral trace of a disc as will maintain the transducer arm and the control arm in desired relative positions.

10. A mounting as claimed in claim 2, wherein actuator means are provided for operating the drive means upon deviation of the transducer arm in one sense from a mean position to impart movement to the slave arm which reduces or cancels the said deviation or causes a deviation in the reverse sense of the transducer arm which is no greater in magnitude than the deviation in the one sense, the said mean position being that in which the point of engagement of the stylus with the spiral trace, the axis normal to the disc of rotation of the transducer arm and the rotational axis normal to the disc of the control arm are substantially coplanar.

11. A mounting as claimed in claim 10, wherein the actuator means are adjustable to enable the magnitude of the maximum deviation from the mean position to be adjusted and to enable the deviations on respective opposite sides of the mean position to be equalised.

12. A mounting as claimed in claim 10, wherein the actuator means comprise respective co-operating elements mounted on the transducer and control arms, contact and separation of the co-operating elements taking place upon rotational movement of the transducer arm about the axis thereof normal to the disc to provide a switching action for operating the drive means.

13. A mounting as claimed in claim 12, wherein the co-operating elements are a pair of spaced wires on the control arm and a blade on the transducer arm for connecting the wires to permit flow of electrical current therebetween.

14. A mounting as claimed in claim 10, wherein the actuator means comprise a magnet and a magnetically operated switch disposed one on the control arm and the other on the transducer arm so that deviation of the transducer arm to a predetermined extent on either side of the mean position effects switching action.

15. A mounting as claimed in claim 10, wherein the actuator means include a photoelectric cell and a light source arranged in relation to the transducer and control arms so that deviation of the transducer arm from the mean position causes variation of the amount of light incident upon the cell.

16. A mounting as claimed in claim 15, wherein shutter means are provided between the photoelectric cell and the light source which limit the range of movement of the transducer arm in which light from the source is incident upon the cell.

17. A mounting as claimed in claim 15, wherein the actuator means include a reflector disposed in the path of light from the light source to the cell.

18. A mounting as claimed in claim 15, wherein the variation of the light from the source incident on the cell is employed to effect continuous variation of the speed of the drive means.

19. A mounting as claimed in claim 1, wherein co-operating means are provided so that in operation of the drive means the path of the axis normal to the plane of the disc of movement of the transducer arm enables movement of the stylus in a part-circular arcuate path.

20. A mounting as claimed in claim 19, wherein the co-operating means comprise a fixed cam and a cam follower biassed into contact with the cam and disposed in fixed relationship to and the axis normal to the disc of rotational movement of the transducer arm.

21. A mounting as claimed in claim 1, wherein the drive means are driven by the disc drive power source.

22. A mounting as claimed in claim 10 wherein the drive means are driven by the disc power source upon operation of the actuator means.

23. A mounting as claimed in claim 1, wherein the drive means comprises a rotary power source and a transmission train connecting the rotary power source with the slave arm, thetransmission train including a selection mechanism whereby any one of a plurality of speed ratios of the transmission train can be chosen.

24. A mounting as claimed in claim 1, wherein the drive means comprises a rotary power source and a transmission train connecting the rotary power source with the slave arm, the transmission train including mechanism whereby within predetermined limits the speed ratio of the transmission train can be continuously varied.

25. A mounting as claimed in claim 1, wherein the drive means comprises a rotary power source and a transmission train connecting the rotary power source with the slave arm, the transmission train including a nonlinear device whereby rotation of the rotary power source at a constant speed causes rotation of the slave arm at a speed which varies in a desired manner over the range of movement of the slave arm.

26. A mounting as claimed in claim 1, wherein the drive means comprises a rotary power source and a transmission train connecting the power source with the slave arm, the transmission train including a clutch or like device whereby the slave arm can itself be rotated without consequent rotation of every part of the transmission train.

27. A mounting as claimed in claim 1, wherein the drive means comprises a rotary driving member, means for varying the speed of the driving member and a transmission train connecting the driving member to the slave arm.

References Cited

UNITED STATES PATENTS

| | | | |
|---|---|---|---|
| 2,192,464 | 3/1940 | Yasuda et al. | 274—23.1 |
| 2,585,396 | 2/1952 | Martin | 274—23.1 |
| 3,059,934 | 10/1962 | Urmenyi | 274—23.1 |

HARRY N. HAROIAN, Primary Examiner

PO-1050
(5/69)

UNITED STATES PATENT OFFICE
CERTIFICATE OF CORRECTION

Patent No. 3,476,394 Dated November 4, 1969

Inventor(s) Richard W. Birch

It is certified that error appears in the above-identified patent and that said Letters Patent are hereby corrected as shown below:

Column 5, line 36, "Plan" should be --Plane--. Column 6, lines 2 and 3, delete "R1, R2 described later. The exact position of blade" and insert --K1, K2. The upper ends of wires K1, K2, are held--. Column 11, line 47, delete "arms". Column 12, line 45, "as" (second occurrence) should be --is--. Column 15, line 38, "oblique should be --obliquely--. Column 16, line 57, "he" should be --The--. Column 20, line 38, "thetransmission" should be --the transmission--.

SIGNED AND
SEALED
MAY 26 1970

(SEAL)
Attest:

Edward M. Fletcher, Jr.
Attesting Officer

WILLIAM E. SCHUYLER, JR.
Commissioner of Patents

UNITED STATES PATENT OFFICE

CERTIFICATE OF CORRECTION

Patent No. 3,476,394 November 4, 1969

Richard W. Birch

It is certified that error appears in the above identified patent and that said Letters Patent are hereby corrected as shown below:

Column 3, line 73, "valves" should read -- values --. Column 8, line 72, "casual" should read -- causal --. Column 14, line 48, "it" should read -- is --.

Signed and sealed this 5th day of January 1971.

(SEAL)
Attest:

Edward M. Fletcher, Jr.
Attesting Officer

WILLIAM E. SCHUYLER, JR.
Commissioner of Patents